United States Patent
Beale et al.

(10) Patent No.: US 12,408,073 B2
(45) Date of Patent: Sep. 2, 2025

(54) METHOD, SYSTEMS, MOBILE NODES AND CIRCUITRY FOR LINK ADAPTATION

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 11 days.

(21) Appl. No.: 17/910,391

(22) PCT Filed: Mar. 26, 2021

(86) PCT No.: PCT/EP2021/057956
§ 371 (c)(1),
(2) Date: Sep. 9, 2022

(87) PCT Pub. No.: WO2021/198078
PCT Pub. Date: Oct. 7, 2021

(65) Prior Publication Data
US 2024/0187920 A1     Jun. 6, 2024

(30) Foreign Application Priority Data
Apr. 1, 2020    (EP) ................................. 20167597

(51) Int. Cl.
*H04W 28/04*     (2009.01)
*H04L 1/00*      (2006.01)
(Continued)

(52) U.S. Cl.
CPC .......... *H04W 28/04* (2013.01); *H04L 1/0013* (2013.01); *H04L 1/08* (2013.01); *H04L 1/203* (2013.01)

(58) Field of Classification Search
CPC ........ H04W 28/04; H04L 1/0013; H04L 1/08; H04L 1/203
See application file for complete search history.

(56) References Cited

U.S. PATENT DOCUMENTS

2004/0133837 A1 * 7/2004 Varma .................. H04L 1/0002
                                                714/760
2008/0130584 A1 * 6/2008 Pani ..................... H04W 72/04
                                                370/332
(Continued)

FOREIGN PATENT DOCUMENTS

CN          1391357 A      1/2003
CN          108886422 A   11/2018
(Continued)

OTHER PUBLICATIONS

IEEE 802_11a 1999 (Year: 1999).*
(Continued)

*Primary Examiner* — Mohammad S Anwar
(74) *Attorney, Agent, or Firm* — XSENSUS, LLP

(57) ABSTRACT

A method of configuring transmissions in a mobile telecommunications network based on a target error rate for the transmissions, the transmissions being between a first mobile node of the mobile telecommunications network and a second mobile node of the mobile telecommunications network. The method comprises, in an initialisation phase, the first and second mobile nodes communicating (S801) in accordance with a first error rate and a first communication configuration, wherein the first error rate is greater than the target error rate; measuring (S802) an initial transmission quality associated with transmissions in the initialisation phase; based on the initial transmission quality associated with the first communication configuration, determining (S803) a second communication configuration corresponding to the target error rate; and in a stable phase, the first and (Continued)

second mobile nodes communicating (S804) in accordance with the target error rate and the second communication configuration.

19 Claims, 6 Drawing Sheets

(51) Int. Cl.
*H04L 1/08* (2006.01)
*H04L 1/20* (2006.01)

(56) References Cited

U.S. PATENT DOCUMENTS

| | | | |
|---|---|---|---|
| 2010/0202284 | A1 | 8/2010 | Tidestav |
| 2010/0304738 | A1* | 12/2010 | Lim ............... H04W 36/302 455/426.1 |
| 2013/0042157 | A1* | 2/2013 | Mohammadi ...... H04L 1/1812 714/704 |
| 2015/0117321 | A1 | 4/2015 | Chen et al. |
| 2016/0330698 | A1* | 11/2016 | Loehr .............. H04W 52/241 |
| 2017/0142696 | A1* | 5/2017 | Kim ................ H04L 1/0009 |
| 2019/0334688 | A1* | 10/2019 | Kwak .............. H04W 72/23 |
| 2019/0379484 | A1* | 12/2019 | Li .................... H04L 1/00 |
| 2020/0169962 | A1* | 5/2020 | Fakoorian ........ H04L 1/1858 |
| 2021/0006385 | A1* | 1/2021 | Zhou ............... H04L 1/1657 |
| 2022/0070900 | A1* | 3/2022 | Yin ................. H04W 72/0446 |

FOREIGN PATENT DOCUMENTS

| | | |
|---|---|---|
| WO | 2015/063622 A1 | 5/2015 |
| WO | 2018/050431 A1 | 3/2018 |
| WO | 2018/091072 A1 | 5/2018 |
| WO | 2021/160755 A1 | 8/2021 |

OTHER PUBLICATIONS

International Search Report and Written Opinion mailed on Jun. 14, 2021, received for PCT Application PCT/EP2021/057956, filed on Mar. 26, 2021, 16 pages.
Intel Corporation, "Views on evaluation methodology and Layer 1 enhancements for Rel-16 eURLLC", 3GPP TSG RAN WG1 Meeting #94, R1-1808705, Aug. 20-24, 2018, pp. 1-10.
Huawei et al., "UCI enhancements for URLLC", 3GPP TSG RAN WG1 Ad-Hoc Meeting 1901, R1-1900044, Jan. 21-25, 2019, 8 pages.
3GPP, "NR; Physical layer procedures for data (Release 16)", 3GPP TS 38.214 V16.0.0, Dec. 2019, pp. 1-147.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.
Nokia et al., "New WID on enhanced Industrial Internet of Things (IoT) and URLLC support",3GPP TSG RAN Meeting #86, RP-193233, Dec. 9-12, 2019, 5 pages.
3GPP, "Study on Scenarios and Requirements for Next Generation Access Technologies; (Release 14)", 3GPP TR 38.913 V14.3.0, Jun. 2017, pp. 1-39.
ZTE et al., "Considerations on CQI /MCS table(s) and related aspects for URLLC", 3GPP TSG RAN WG1 Meeting #92bis, R1-1803800, Apr. 16-20, 2018, pp. 1-17.
ZTE et al., "URLLC PHY enhancements", 3GPP TSG RAN WG1 Meeting #94, R1-1808211, Aug. 20-24, 2018, 10 pages.
Mediatek Inc, "On CQI/MCS Design for Urllc", 3GPP TSG RAN WG1 #92bis, Apr. 16-20, 2018, R1-1804078, Sanya, China.
Samsung, "Evaluation assumptions for NR multiple access", 3GPP TSG RAN WG1 Meeting #85, May 23-27, 2016, R1-163983, Nanjing, China.

* cited by examiner

METHOD, SYSTEMS, MOBILE NODES AND CIRCUITRY FOR LINK ADAPTATION

CROSS-REFERENCE TO RELATED APPLICATIONS

The present application is based on PCT filing PCT/EP2021/057956, filed Mar. 26, 2021, which claims the Paris Convention priority of European patent application EP 20167597.2, filed Apr. 1, 2020, the entire contents of each are hereby incorporated by reference.

FIELD

The present disclosure relates to methods, systems, mobile nodes and circuitry for configuring transmissions in a mobile telecommunications network, in particular based on an error rate.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as an Ultra Reliable Low Latency Communications (URLLC) service which, as its name suggests, requires that a data unit or packet be communicated with a high reliability and with a low communications delay. URLLC type services therefore represent a challenging example for both LTE type communications systems and 5G/NR communications systems.

PCT application PCT/EP2017/071636, published as WO2018050431 and entitled "Wireless telecommunications apparatus and methods" provides a discussion of low latency transmissions (e.g. URLLC transmissions) that may be of interest to the skilled reader.

The increasing use of different types of communications devices associated with different traffic profiles gives rise to new challenges for efficiently handling communications in wireless telecommunications systems that need to be addressed.

SUMMARY

The present invention is defined in the appended claims.

According to a first example of the present disclosure, there is provided a method of configuring transmissions in a mobile telecommunications network based on a target error rate for the transmissions, the transmissions being between a first mobile node of the mobile telecommunications network and a second mobile node (also sometimes referred to as "functional node") of the mobile telecommunications network. The method comprises in an initialisation phase, the first and second mobile nodes communicating in accordance with a first error rate and a first communication configuration, wherein the first error rate is greater than the target error rate. The method also comprises measuring, for example by the first node, an initial transmission quality associated with transmissions in the initialisation phase, for example transmissions from the second mobile node. Based on the initial transmission quality associated with the first communication configuration, a second communication configuration corresponding to the target error rate is determined. In a stable phase, the first and second mobile nodes communicate in accordance with the target error rate and the second communication configuration.

The initialisation phase may terminate once N (N≥1) unsuccessful transmissions have been detected in the communications between the first and second mobile nodes. The number N of unsuccessful transmissions may be set based on either the first error rate or the target error rate.

In the initialisation phase, the first and second mobile nodes may communicate in accordance with an intermediate communication configuration which is associated with an intermediate error rate lower than the first error rate. For example, the intermediate error rate may be lower than the first error rate and may be higher than the target error rate.

Downlink transmission sub-slots in the first communication configuration may be shorter than downlink transmission sub-slots in the second communication configuration. This may enable shorter cycles of communication (which may for example enable the use of repetition and/or retransmissions) and/or of updating communication configurations.

The method may comprise measuring a further transmission quality associated with transmissions in the stable phase. The initial transmission quality may be associated with measurements for a first set of resource units and the further transmission quality may be associated with measurements for a second set of resource units, wherein a first ratio of the number of resource units in the first set relative to the number of resource unit in the transmissions in the initialisation phase is greater than a second proportion of the number of resource units in the second set relative to the number of resource units in the transmissions in the stable phase. In this context, a resource unit can for example be a physical bit, a physical resource block, a resource element or any other suitable resource unit.

The method may comprise identifying a transmission from the second mobile node to the first mobile node which is unsuccessful and identifying whether the identified transmission was during the initialisation phase. If the identified transmission was during the initialisation phase, the first mobile node may transmit an aperiodic quality indication to the second mobile node. For example, the first mobile node may not transmit an aperiodic quality indication to the second mobile node if the identified transmission was not during the initialisation phase, e.g. was during the stable phase. An aperiodic quality indication may for example be an A-CSI.

The method may comprise identifying a transmission from the second mobile node to the first mobile node which is unsuccessful. If the identified transmission was during the initialisation phase, the first mobile node can transmit an aperiodic quality indicator of a first type to the second mobile node and if the identified transmission was during the stable phase, the first mobile node can transmit an aperiodic quality indicator of a second type to the second mobile node, the second type of aperiodic quality indicator being different from the first type of aperiodic quality indicator.

The method may comprise the first mobile node estimating, based on the measured initial transmission quality, a number of re-transmissions or repetitions for reaching the target error rate; the first mobile node reporting to the second mobile node the estimated number of re-transmissions or repetitions; and the second mobile node determining a second communication configuration based on the reported estimated number of re-transmissions or repetitions.

An allocated format or window of an uplink control channel for reporting whether downlink transmissions have been successful may be smaller in the first communication configuration compared to the allocated format or window, respectively, in the second communication configuration. For example, the format may correspond to a physical uplink control channel format which may provide for more bits for ACK/NACK reporting and/or more frequent bits for ACK/NACK reporting. Additionally or alternatively, the size of a physical uplink control channel window may be reduced so that acknowledgement feedback can be sent quicker and/or re-transmissions (if used) can be scheduled more quickly.

In the initialisation phase, the first mobile node may use a first number of acknowledgement messages to acknowledge each transmission from the second mobile node and, in the stable phase, the first mobile node may use a second number of acknowledgement messages to acknowledge each transmission from the second mobile node, the second number of acknowledgement messages being different from and less than the first number of acknowledgement messages.

For example, in the initialisation phase, the number of acknowledgement messages to acknowledge a given transmission from the second mobile node may comprise a first acknowledgement message corresponding to a first repetition of the given transmission and a second acknowledgement message corresponding to a combination of a first repetition of the given transmission and a second repetition of the given transmission.

Additionally or alternatively, in the initialisation phase, the number of acknowledgement messages to acknowledge a given transmission from the second mobile node may comprise an acknowledgement message corresponding to a decoding attempt using a first coding rate and a further acknowledgement message corresponding to a further decoding attempt using a further coding rate, the further coding rate being different from the first coding rate.

Additionally or alternatively, in the initialisation phase, the first mobile node may be configured to measure an initial transmission quality associated with transmissions in the initialisation phase using a full decoding attempt for decoding a first transmission received from the second mobile node in the initialisation phase using all symbols or physical bits for the first transmission and a partial decoding attempt for decoding the first transmission using some but not all symbols or physical bits, respectively, for the first transmission. The method then further comprises transmitting a first acknowledgement message relating to the full decoding attempt and a second acknowledgement message relating to the partial decoding attempt.

The first communication configuration may be associated with a repetition of two or more for at least some of the transmissions and the second communication configuration can then be associated with a deactivation of the repetition of the transmissions.

Measuring an initial transmission quality may comprise the first mobile node measuring for at least a transmission, a detected error rate for each of a plurality of coding rates.

For example, measuring for the at least a transmission, a detected error rate for each of a plurality of coding rates may comprise the first mobile node puncturing the at least a transmission to simulate receiving the at least a transmission at different coding rates.

Alternatively or additionally, the at least a transmission may comprise two or more portions wherein a first portion is encoded using a first coding rate and wherein a further portion is encoded using a further coding rate different from the first coding rate. The first mobile node can then determine an error rate associated with the first portion and a second error rate associated with a second portion.

Alternatively or additionally, the first mobile node can transmit an error rate report indicating the detected error rate for each of a plurality of coding rates; and/or derive, based on the target error rate and on the detected error rate for each of a plurality of coding rates, a recommended coding rate for achieving the target error rate and transmitting a recommendation report indicating the recommended coding rate.

Alternatively or additionally, the method may comprise the first or second mobile node determining one or more interpolation parameters based on transmission quality information from a plurality of mobile nodes, wherein the interpolation parameters are for determining a configuration for a transmission parameter based on a desired error rate from known error rates for other configurations of the transmission parameter. For example, the method may comprise at least one of the first and second mobile nodes storing the determined one or more interpolation parameters; and upon detection of a reconnection event between the first mobile node and the second mobile node, using the stored interpolation parameters to determine a configuration for a transmission parameter based on a desired error rate for communications between the first mobile node and the functional node. For example, the parameters may be first stored (e.g. when first determined or when the first mobile node disconnects from the cell, etc.) for use once the first mobile node is connected again to the second mobile node.

Additionally or alternatively, the first or second mobile node, respectively, may transmit the one or more interpolation parameters.

The method may further comprise reporting the measured transmission quality associated with the first communication configuration; measuring (e.g. by the first mobile node) a further transmission quality associated with transmissions (e.g. from the second mobile node) in the stable phase. The first communication configuration can be associated with a first timing configuration for reporting the measured transmission quality and the second communication configuration can be associated with a second timing configuration for reporting the measured further transmission quality. The first timing configuration can indicate more frequent reporting opportunities than the reporting opportunities indicated in the second timing configuration.

For example, the reporting of the measured transmission quality can be based on a transmission quality relative to the first error rate and the reporting of the measured further transmission quality can be based on a transmission quality relative to the target error rate.

Alternatively or additionally, the reporting of the measured transmission quality is based on a transmission quality relative to the first error rate and a transmission quality relative to the second error rate different from the first error rate (for example the second error rate may be target error rate or may be an error rate which is lower than the first error rate and higher than the target error rate). The reporting of the measured further transmission quality may be based on a transmission quality relative to the target error rate.

In some examples, the method may further comprise reporting the measured transmission quality associated with the first communication configuration, wherein reporting the measured transmission quality comprises transmitting a first transmission quality report based on the measured transmission quality; determining if a predetermined timer has expired since the previous transmission quality report was transmitted; and transmitting a further transmission quality report based on the measured transmission quality. In this example, if a predetermined timer has expired since the previous transmission quality report was transmitted, the further transmission quality report is based on the first error rate and if the predetermined timer has not expired since the previous transmission quality report was transmitted, the further transmission quality report is based on the target error rate.

The method may further comprise the first mobile node reporting the measured transmission quality associated with the first communication configuration by first reporting the measured transmission quality associated with the first communication configuration based on a first correspondence table, wherein the first correspondence table associates transmission quality measurements with one or more reporting values and, based on the measured transmission quality, later reporting the measured transmission quality based on a second correspondence table associating transmission quality measurements with one or more reporting values, the second correspondence table being different from the first correspondence table.

For example, the second mobile node can, based on the measured transmission quality, instruct the first mobile node to report the measured transmission quality based on the second correspondence table.

Alternatively or additionally, the first and second correspondence tables can each associate modulation and coding schemes with corresponding reporting values. The first mobile node reporting the measured transmission quality comprises the first mobile node selecting a modulation and coding scheme based on a desired error rate and reporting a value corresponding to the selected modulation scheme. The first and second correspondence tables are associated with the same desired error rate and the second correspondence table provides a finer granularity of modulation and coding schemes around the modulation and coding scheme first reported using the first table.

In some examples, the first communication configuration comprises one or more of: a sub-slot size; a number of symbols per sub-slot, a number of resource blocks in a sub-slot, a modulation and coding scheme and an allocated size of an uplink control channel for reporting whether downlink transmissions have been successful.

The second communication configuration may comprise one or more of: a sub-slot size; a number of symbols per sub-slot, a number of resource blocks in a sub-slot, a modulation and coding scheme and an allocated size of an uplink control channel for reporting whether downlink transmissions have been successful.

For example, in the first configuration relative to the second configuration, the sub-slot size may be shorter, the number of symbols per sub-slots may be less, the number of resource blocks in a sub-slot may be less, a modulation and coding scheme may be less efficient, an allocated size of an uplink control channel for reporting whether downlink transmissions have been successful may be greater.

The first mobile node may be one or more of: a mobile terminal, a UE, a mobile station and a relay.

The second mobile node may be one or more of a base station, a relay, a remote radio head, a mobile station (e.g. in a device to device environment) and a transmission/reception point. The second mobile node may for example be a mobile node that provides a wireless interface for the first mobile node to communicate with the mobile telecommunications network, for example with a core network of the mobile telecommunications network and/or with a mobile station in the mobile telecommunications network.

In some examples, the target error rate is one or more of: less than or equal to $10^{-2}$; less than or equal to $10^{-3}$; less than or equal to $10^{-4}$; less than or equal to $10^{-5}$; less than or equal to $10^{-6}$.

According to a second example of the present disclosure, there is provided a method of operating a first mobile node in a mobile telecommunications network and for configuring transmissions based on a target error rate for the transmissions, the transmissions being between the first mobile node and a second mobile node of the mobile telecommunications network. The method comprises the first mobile node, in an initialisation phase, communicating with the second mobile node in accordance with a first error rate and a first communication configuration, wherein the first error rate is greater than the target error rate; measuring an initial transmission quality associated with transmissions in the initialisation phase; determining, based on the initial transmission quality associated with the first communication configuration, a second communication configuration corresponding to the target error rate; and, in a stable phase, communicating with the second mobile node in accordance with the target error rate and the second communication configuration.

According to a third example of the present disclosure, there is provided a mobile node for use in a mobile telecommunications network and for configuring transmissions based on a target error rate for the transmissions, the transmissions being between the mobile node and a second mobile node of the mobile telecommunications network. The mobile node is configured to, in an initialisation phase, communicate with the second mobile node in accordance with a first error rate and a first communication configuration, wherein the first error rate is greater than the target error rate; measure an initial transmission quality associated with transmissions in the initialisation phase; determine a second communication configuration corresponding to the target error rate, wherein the second communication configuration is based on the initial transmission quality associated with the first communication configuration; and in a stable phase, communicate with the second mobile node in accordance with the target error rate and the second communication configuration. The mobile node can for example use one or more configurations which can be determined by the mobile node itself or which can be determined based on a signal or indication from the second node. For example, between the initialisation and stable phases, the mobile node may use a different sub-slot size (e.g. as configured or indicated by the network and/or the second mobile node), may decode received transmissions using a different MCS (e.g. selected to correspond to a higher or lower error rate target, e.g. by the network or second mobile node), use a reporting scheme associated with different error rate target, etc.

According to a fourth example of the present disclosure, there is provided circuitry for a mobile node for use in a mobile telecommunications network and for configuring transmissions based on a target error rate for the transmissions, the transmissions being between the mobile node and a second mobile node of the mobile telecommunications network via a wireless access interface of the mobile telecommunications network. The circuitry comprises transmitter circuitry configured to transmit signals via the wireless access interface, receiver circuitry configured to receive signals via the wireless access interface, and controller circuitry. The controller circuitry is configured to control the transmitter and the receiver to: communicate, in an initialisation phase, with the second mobile node in accordance with a first error rate and a first communication configuration, wherein the first error rate is greater than the target error rate; measure an initial transmission quality associated with transmissions in the initialisation phase; determine, based on the initial transmission quality associated with the first communication configuration, a second communication configuration corresponding to the target error rate; and communicate, in a stable phase, with the second mobile node in accordance with the target error rate and the second communication configuration.

According to a fifth example of the present disclosure, there is provided a method of operating a functional node (e.g. second node above or below) in a mobile telecommunications network and for configuring transmissions based on a target error rate for the transmissions, and the transmissions being between a first mobile node of the mobile telecommunications network and the functional node. The method comprises the functional node: communicating, in an initialisation phase, with the first mobile node in accordance with a first error rate and a first communication configuration, wherein the first error rate is greater than the target error rate; based on an initial transmission quality associated with the first communication configuration, determining a second communication configuration corresponding to the target error rate; and communicating, in a stable phase, with the first mobile node in accordance with the target error rate and the second communication configuration.

The method may comprise the functional node receiving, from the first mobile node, one or more interpolation parameters for determining a configuration for a transmission parameter based on a desired error rate and based on known error rates for other configurations of the transmission parameter; receiving, from at least a further mobile node of the mobile telecommunications network, one or more further interpolation parameters for determining a configuration for a transmission parameter based on a desired error rate and based on known error rates for other configurations of the transmission parameter; averaging the received one or more interpolation parameters and the received one or more further interpolation parameters to determine one or more average interpolation parameters; and determining a configuration for a transmission parameter based on the one or more average interpolation parameters.

In some examples, the method may comprise the functional node receiving from the first mobile node a recommended coding rate for achieving the target error rate; and determining the second configuration based on the recommended coding rate.

The method may comprise receiving, from the first mobile node, one or more interpolation parameters for determining a configuration for a transmission parameter based on a desired error rate and based on known error rates for other configurations of the transmission parameter. The one or more interpolation parameters can for example be received during the initialisation phase, e.g. be based on at least the first error rate and first communication configuration of the initialisation phase, possibly with additional error rate(s) and/or communication configuration(s).

According to a sixth example of the present disclosure, there is provided a functional node for use in a mobile telecommunications network and for configuring transmissions based on a target error rate for the transmissions, the transmissions being between a first mobile node of the mobile telecommunications network and the functional node. The functional node is configured to communicate, in an initialisation phase, with the first mobile node in accordance with a first error rate and a first communication configuration, wherein the first error rate is greater than the target error rate; determine a second communication configuration corresponding to the target error rate wherein the second communication configuration is based on an initial transmission quality associated with the first communication configuration; and communicate, in a stable phase, with the first mobile node in accordance with the target error rate and the second communication configuration.

According to a seventh example of the present disclosure, there is provided circuitry for a functional node for use in a mobile telecommunications network and for configuring transmissions based on a target error rate for the transmissions, the transmissions being between a first mobile node of the mobile telecommunications network and the functional node via a wireless access interface of the mobile telecommunications network. The circuitry comprises transmitter circuitry configured to transmit signals via the wireless access interface, receiver circuitry configured to receive signals via the wireless access interface, and controller circuitry. The controller circuitry is configured to control the transmitter and the receiver to communicate, in an initialisation phase, with the first mobile node in accordance with a first error rate and a first communication configuration, wherein the first error rate is greater than the target error rate; determine a second communication configuration corresponding to the target error rate wherein the second communication configuration is based on an initial transmission quality associated with the first communication configuration; and communicate, in a stable phase, with the first mobile node in accordance with the target error rate and the second communication configuration.

According to an eighth example of the present disclosure, there is provided a system for use in a mobile telecommunications network, the system comprising a first mobile node of the mobile telecommunications network and a second mobile node of the mobile telecommunications network and the system being for configuring transmissions based on a target error rate for transmissions between the first mobile node and the second mobile node. The first mobile node and second mobile node are configured to communicate, in an initialisation phase, in accordance with a first error rate and a first communication configuration, wherein the first error rate is greater than the target error rate; and to communicate, in a stable phase, in accordance with the target error rate and a second communication configuration. At least one of the first mobile node and second mobile node is configured to measure an initial transmission quality associated with transmissions in the initialisation phase and at least one of the first mobile node and second mobile node is configured to determine, based on the initial transmission quality associated with the first communication configuration, the second communication configuration corresponding to the target error rate.

Respective aspects and features of the present disclosure are defined in the appended claims.

It is to be understood that both the foregoing general description and the following detailed description are illustrative only and are not restrictive, of the techniques and teachings of the present disclosure. While the present disclosure includes example arrangements falling within the scope of the claims (and while other example arrangements may also fall within the scope of the claims), it may also include example arrangements that do not necessarily fall within the scope of the claims but which are then useful to understand the teachings and techniques provided herein.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF EXAMPLES

Long Term Evolution Advanced Radio Access Technology (4G)

Figure 1:
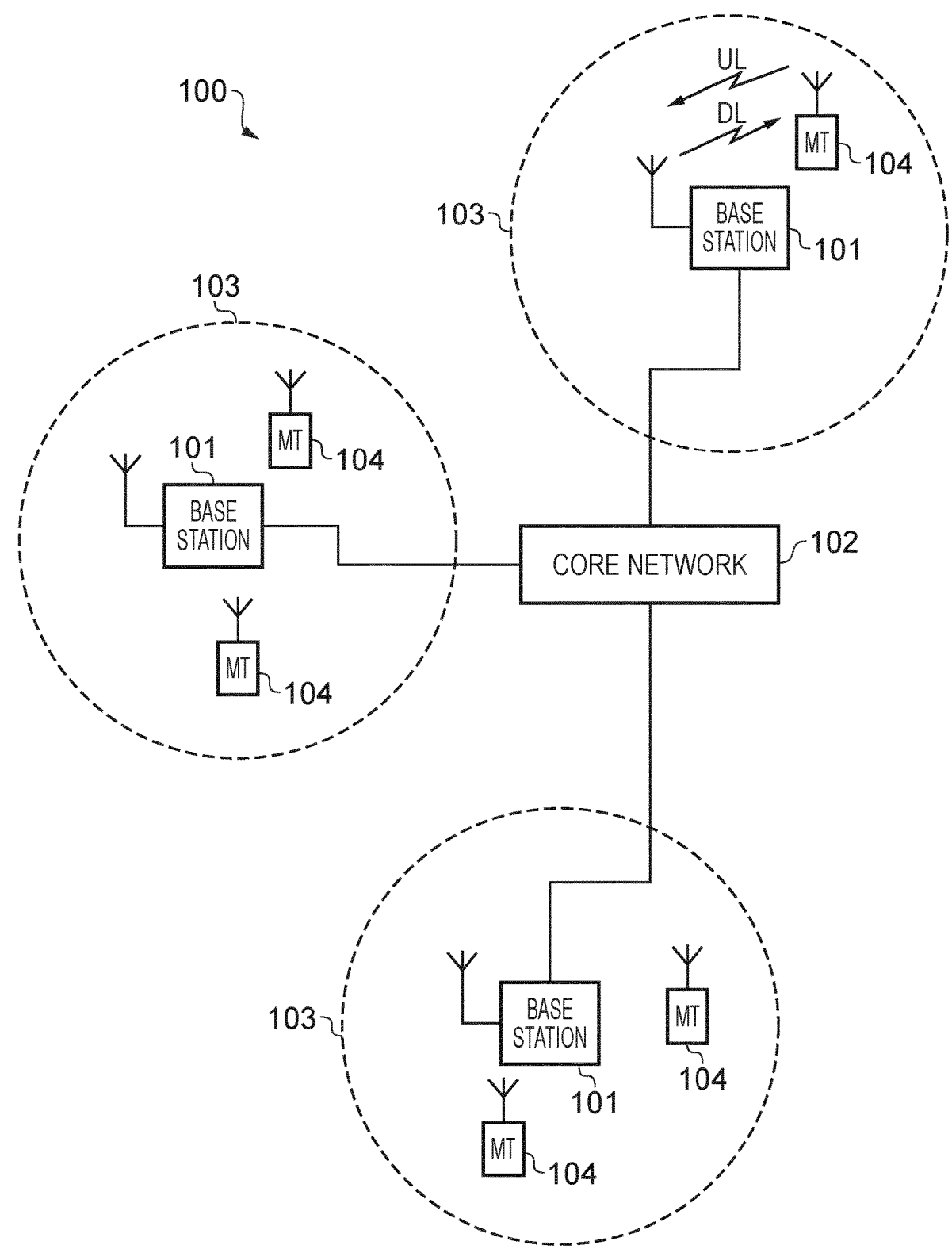
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on.

Communications devices may also be referred to as mobile stations, mobile terminals (MT), user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard, different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
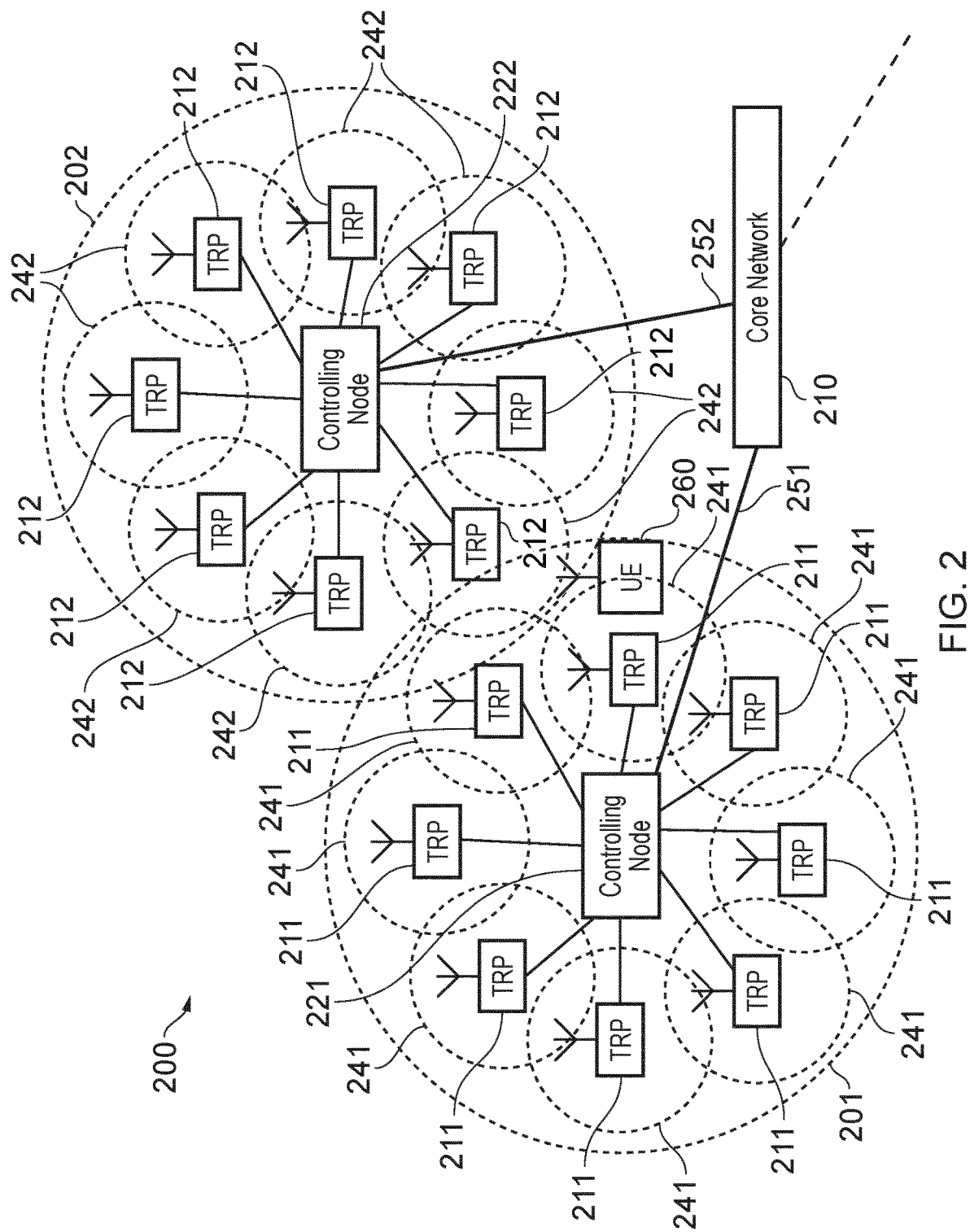
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or mobile terminal or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
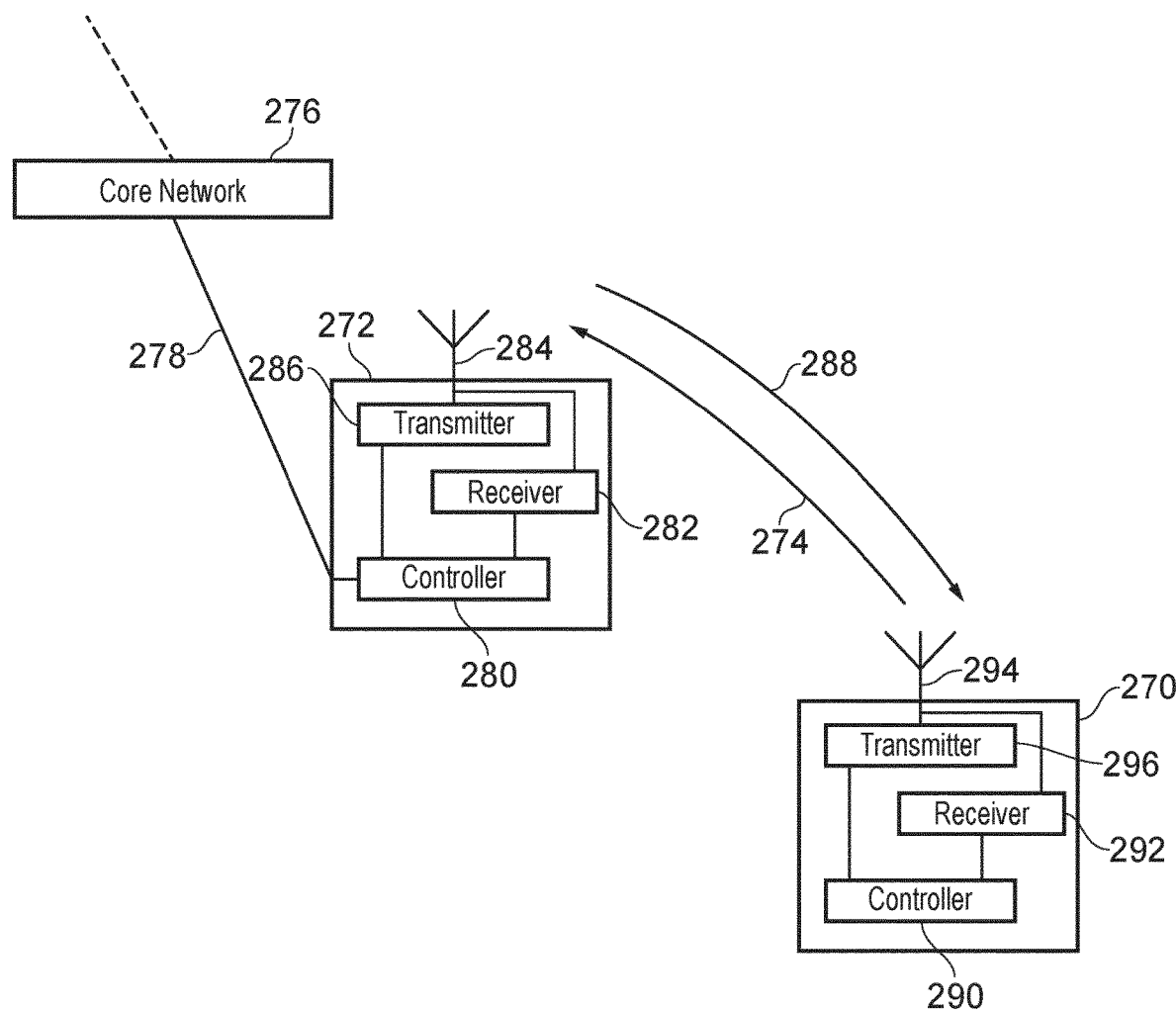
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/ chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, two particular types of services have been defined as desired NR functionalities:

Enhanced Mobile Broadband (eMBB)
Ultra Reliable & Low Latency Communications (URLLC)

Figure 4:
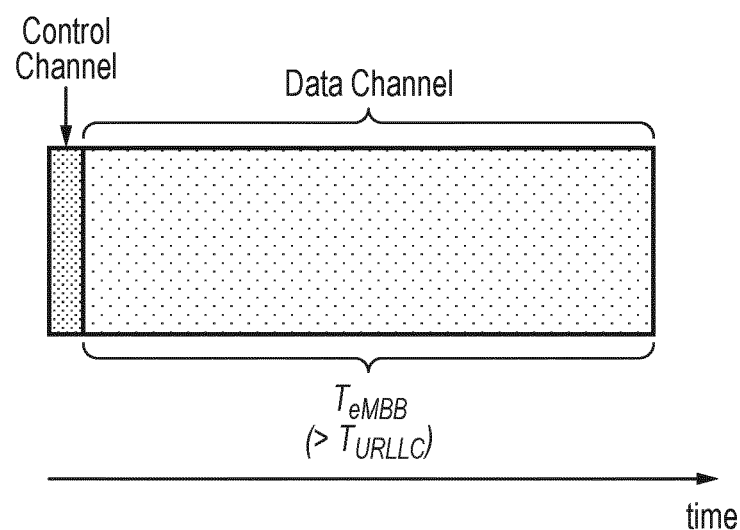
FIG. 4 illustrates an example frame structure for an eMBB transmission.

Enhanced Mobile Broadband (eMBB) services are characterised by high capacity with a requirement to support up to 20 Gb/s. For efficient transmission of large amounts of data at high throughput, eMBB is likely to use slot-based transmissions to minimise the overhead used. An example eMBB frame structure in the downlink is shown in FIG. 4 with transmission period $T_{eMBB}$, where the control channel uses fewer transmission resources than the data channel.

Figure 5:
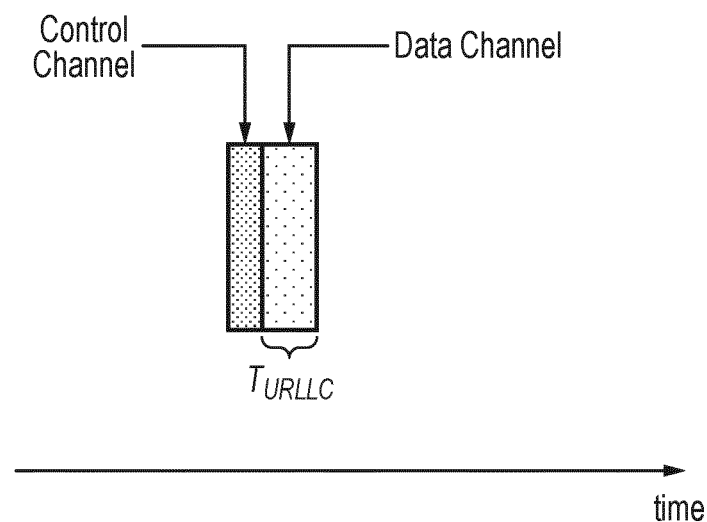
FIG. 5 illustrates an example frame structure for an URLLC transmission.

An important requirement for URLLC is low latency measured from the ingress of a layer 2 packet to its egress from the network, with a proposed target of 1 ms. The URLLC data is expected to be short and hence short scheduling times are desirable, where the control and data transmissions have a short duration. As a result, the URLLC transmissions use a frame duration that is less than that of the eMBB frame. For example, while a typical eMBB frame duration is 1 ms, a URLLC frame structure can use a much shorter transmission period $T_{URLLC}$ (for example 0.25 ms). FIG. 5 illustrates an example frame structure for a URLLC transmission. As a result, the control and data channels occupy a smaller time period (i.e. the transmission period of URLLC $T_{URLLC}$ is smaller than that of eMBB $T_{eMBB}$). While the relative overhead is expected to be greater with URLLC transmissions, the URLLC transmissions are also associated with shorter latency performance (i.e. a better performance with less latency), compared to eMBB transmissions.

The desired targets for URLLC services also include a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher with either 0.5 ms or 1 ms of user plane latency. High reliability communications are therefore associated with very low BLock Error Rate (BLER), such as a BLER target of $10^{-5}$. Conventional BLER targets for legacy communications or non-high reliability communications are often of the order of $10^{-1}$ (10%).

Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network. This use case is sometimes referred to as Industry 4.0.

In order to achieve a BLER target, the wireless communications between a mobile station and a communication node will be monitored so that the wireless communications can be configured to achieve the BLER target.

In many communication systems (e.g. HSPA, LTE, NR), the UE sends channel quality information to the base station (e.g. BTS, NodeB, eNB, gNB, etc.) allowing the base station to track fast fading and apply a suitable modulation and coding scheme in the downlink.

A Channel Quality Indicator CQI can be signalled from the UE to the base station as a preferred modulation and coding scheme (MCS). The signalled preferred MCS typically relates to the MCS that is expected to result in a target block error rate (BLER) if that MCS were applied by the base station. The CQI is generally determined by the UE based on the Signal-to-Noise Ratio (SNR) or Signal-to-Noise plus Interference Ratio (SINR) observed at the UE. The UE would typically implement a look up table mapping measured SNR or SINR to reported CQI.

It is noteworthy that an error rate (e.g. BLER) target can be set at any appropriate scale, for example based on any one or any combination of: per UE, per cell, per base station, per service type, per network, based on a time configuration, etc. In current systems, a UE will often receive different CQI tables which correspond to different BLER targets. Accordingly, the CQI table that the UE will use will depend on the BLER target it is currently using. It will be appreciated that the CQI table arrangement is based on current systems but that other techniques may be used for terminals and/or base stations to try to reach and maintain a BLER target.

It is also pointed out that in current systems, CQI relates to the downlink only. This is at least in part because in current systems the gNB will configure many (if not most) of the downlink and uplink communication parameters and because the gNB can measure and obtain uplink channel quality information as it will receive the uplink transmissions itself. However, it is conceivable that in other arrangements, at least some quality information may be reported from the network (e.g. base station, gNB) to a terminal.

The UE implementation for CQI is typically complex and it can be very difficult to create an implementation that can accurately determine an optimal MCS to achieve a BLER of 10% over many different channel models.

Additionally, the CQI specification currently relates to the MCS that would be required to achieve a 10% BLER. However the base station may wish to operate at a different BLER target. For example, the base station may wish to operate at a BLER target of 0.1% or lower for URLLC use cases.

Accordingly, there may be cases where the gNB cannot rely on the CQI report from the UE in order to choose an MCS for downlink transmissions. For example, in the two example situations discussed above (an imperfect or suboptimal UE implementation and a BLER target configured at the gNB which is different to the BLER target assumed at the UE when reporting the CQI).

CQI Outer Loop

Based on the above discussion, it is apparent that there are many cases where the base station cannot necessarily rely too heavily on the CQI report from the UE in order to choose an MCS for downlink transmissions.

In order to try to cater for the above imperfections, the base station would typically implement a "CQI outer loop". The CQI outer loop is a control loop or feedback loop that controls the MCS applied to downlink transmissions based on the reported CQI and on the ACK/NACK feedback (or hybrid automatic repeat request system "HARQ" feedback) from the UE.

Figure 6:
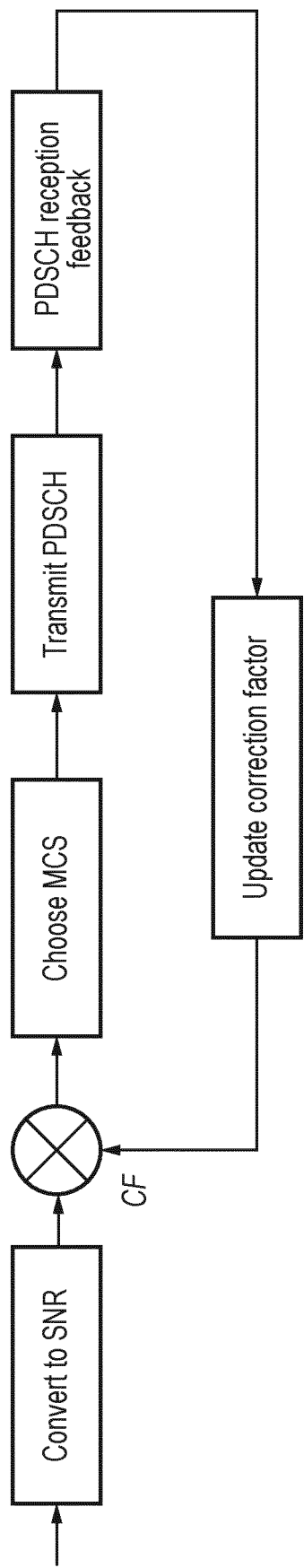
FIG. 6 illustrates an example CQI outer loop in a base station.

An example of a CQI outer loop, as implemented in a base station and a UE, is shown in FIG. 6. The actual implementation of CQI outer loop functionality is not currently specified in standard documents. In other words, this function is implementation dependent and may vary from one base station to another. Hence FIG. 6 is just one possible implementation of a CQI outer loop, if provided.

The functionalities of elements within the CQI outer loop of FIG. 6 are described below:

Convert to SNR: the base station receives a CQI report from the UE (which can be considered as an indication of an MCS expected by the UE to be required to achieve a 10% BLER). The base station can convert that CQI report into a corresponding SNR. The conversion could be implemented through the use of a look up table (of CQI value vs SNR).

It is noteworthy that the UE can send periodic and/or aperiodic CQI reports, depending on configuration from the base station.

Correction (illustrated as a circle with a cross inside in FIG. 6): the SNR value is corrected by a correction factor, CF, to produce a corrected SNR. An example correction function would produce a corrected SNR as:

$SNR_{corrected} = SNR_{in} \times CF$

Choose MCS: an MCS for a PDSCH transmission is chosen, based on $SNR_{corrected}$. The choice of MCS based on SNR could be made, for example, by use of a look up table.

Transmit PDSCH: the PDSCH is transmitted by the base station using the MCS determined in the previous step.

PDSCH reception feedback: the UE receives the PDSCH and sends an ACK or NACK to the base station, for example via the PUCCH. An ACK will indicate a successful transmission (of the PDSCH) while a NACK will indicate an unsuccessful transmission.

Update correction factor: the base station updates the correction factor, based on ACK or NACK status for previous downlink transmissions. For example:

NACK received: if the PDSCH had been NACKed, it would indicate that the MCS chosen had been too optimistic. $SNR_{corrected}$ should have been lower, leading to a lower applied MCS. Hence the correction factor can be reduced.

ACK received: if the PDSCH had been ACKed, it would indicate that the MCS chosen had been too pessimistic. $SNR_{corrected}$ should have been higher, leading to a higher applied MCS. Hence the correction factor can be increased.

From one perspective, the CQI outer loop can be seen as attempting to control the correction factor (and hence the applied MCS) with a view to operating at the expected BLER taking into account the varying SNR conditions.

One method of varying the correction factor, CF, includes using a step size parameter, $CF_{step}$, and applying the following updates to the correction factor, based on the ACK/NACK status reported by the UE and on a parameter n:

NACK: $CF_{new} = CF_{old} - CF_{step}$

ACK: $CF_{new} = CF_{old} + CF_{step}/(n-1)$

In a steady and stable environment, these updates are expected to lead to BLER=1/n being achieved.

Figure 7:
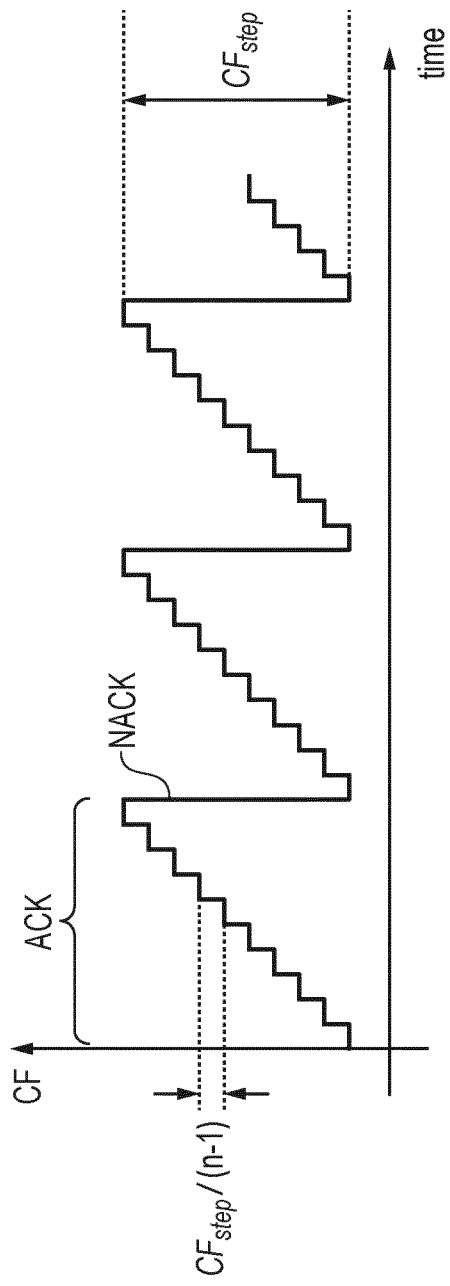
FIG. 7 illustrates an example variation of a Correction Factor "CF" in a CQI outer loop.

FIG. 7 illustrates an example variation with time of a Correction Factor "CF" in a CQI outer loop using the example algorithm described above. This illustrative example is for a BLER target of 10% (such that n=10 in the algorithm above). As can be observed in this example, a negative acknowledgement can have a significant effect that is proportionally much greater on the overall correction factor and control of the transmission parameters than positive acknowledgement.

In current systems, a gNodeB would typically base any MCS scheduling decision by considering both the received Channel State Information (CSI) reports and/or CQI report and the measured BLER. From one perspective, the measured BLER can be considered as the ratio of the total number of NACKs received to the total number of scheduled transmissions.

If the measured BLER is worse (higher) than the target BLER (also called BLER target), the gNodeB makes scheduling decisions that are more pessimistic than the reported CQI. Namely, the gNodeB can consider that the channel conditions are worse than the conditions indicated by the reported CQI (this is sometimes described as the reported CQI being "backed-off"). On the other hand, if the measured BLER is better (lower) than the target BLER, the gNodeB makes more optimistic scheduling decisions than the reported CQI. For example, the gNodeB can consider that the channel quality might be better than the one reported or indicated in the reported CQI. Such functionalities can typically be implemented using a CQI outer loop.

As the skilled person will appreciate, FIGS. 6 and 7 and the discussion above are illustrative examples which are useful for understanding some of context of the present disclosure and challenges faced when configuring transmissions or communications in a mobile telecommunications network.

For some types of operations, such as URLLC, where high reliability or low BLER target operation is required, current CQI outer loop functionality may not efficiently operate at low BLER targets. This is in part due to low BLER targets taking longer to measure accurately and being generally more difficult to measure.

For example, if the BLER target is $10^{-5}$ and we take a configuration where at least 10 NACKs are awaited before a statistically reasonable estimate of the BLER can be made, then $10^6$ packets have to be transmitted by the gNodeB before the BLER can be measured to the expected level of accuracy. As an illustration, if one packet is transmitted every 1 ms, 1000 seconds (approximately 17 minutes) will elapse before an accurate BLER is measured. In other words, the system may have to wait 17 minutes before it can determine whether the BLER target is met and whether the MCS (or other transmission configuration) may be changed. And if it is changed, the same calculation will apply to the new configuration. This is unlikely to be found satisfactory, even less so if the communications are low latency and high reliability.

It is therefore challenging to provide an arrangement which can both meet a low BLER target but which can also address the limitation discussed above regarding effective configuration of transmissions.

According to teachings of the present disclosure, there are provided techniques for configuring transmissions and which are expected to increase the ability to meet a low or very low BLER target.

Figure 8:
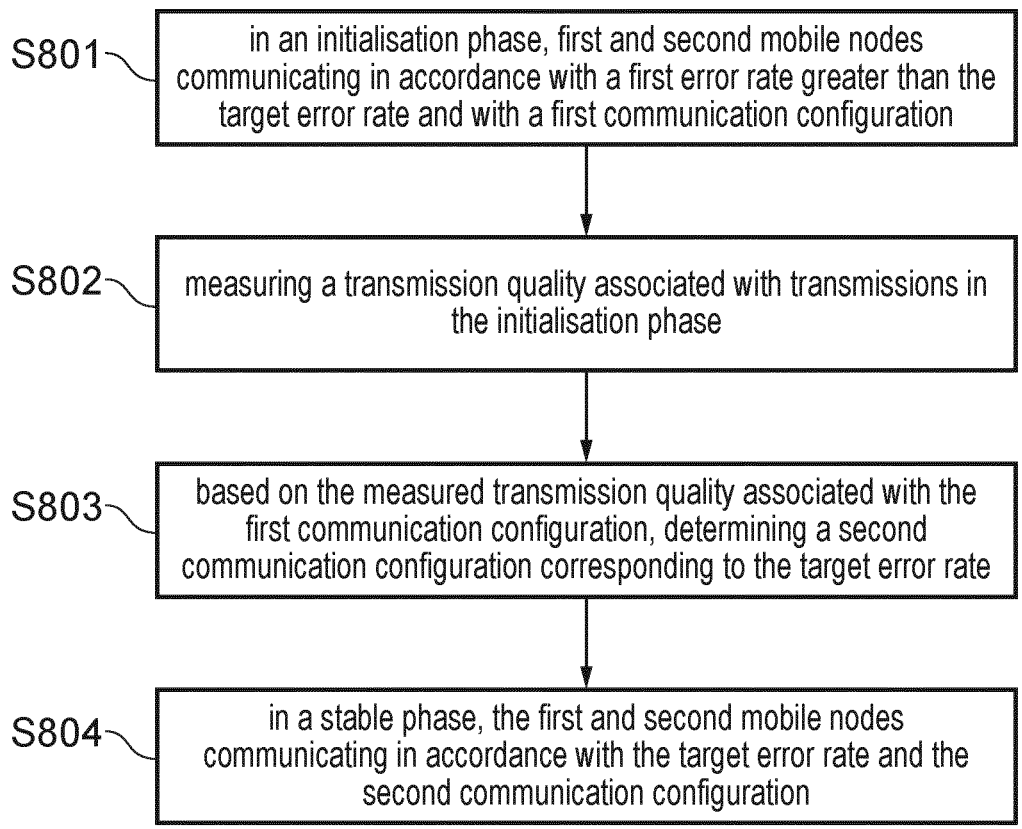
FIG. 8 illustrates an example method of configuring transmissions in a mobile network.

FIG. 8 illustrates an example method of configuring transmissions in a mobile network based on a target error rate. At step S801, in an initialisation phase, first and second mobile nodes of the mobile telecommunications network communicate in accordance with a first error rate and with a first communication configuration. The first error rate is greater than the target error rate, namely the two mobile nodes are configured to communicate with more errors and less reliability compared to communications in accordance with the target error rate.

Then, at step S802, a transmission quality associated with transmissions in the initialisation phase is measured and at S803 a second communication configuration corresponding to the target error rate is determined, based on the transmission quality associated with the first communication configuration measured at S802. At S804 and in a stable phase, the first and second mobile nodes can communicate in accordance with the target error rate and with the second communication configuration selected at S803.

Accordingly, by configuring the system to operate with a higher error rate than desired and by intentionally and temporarily configuring communications under the expected quality level, information can be obtained which can help determine one or more communication or transmission configuration and/or parameter which is expected to enable the first and second nodes to reach the target BLER in their communications. A more "optimistic" configuration is used in the initial phase and which can be used for the system to gather information about how optimistic the configuration is. During a more stable phase, a more pessimistic configuration can be used which will be expected to be closer to the optimal configuration(s) for achieving the BLER target. And while the configuration determined at S803 may be further updated later and while it may not be sufficient to achieve the target error rate (or conversely enabling an error rate which is lower or much lower than the target error rate), it is expected that convergence towards the target error rate can be accelerated compared to other systems.

It is also noteworthy that the system may operate using one or more intermediate phases where transmissions are configured based on another communication configuration and another error rate, the other error rate being less than the first error rate (and optionally less than a previous error rate of another previous intermediate phase) and more than the target error rate (and optionally more than a further later error rate of another intermediate phase).

Different techniques may be applied during the initialisation phase and/or to report measurements used to determine the second configuration.

In the interest of consistency, many examples herein will use an example BLER target of $10^{-5}$. However the skilled person will appreciate that the same teachings apply equally to other BLER targets which can be more or less than $10^{-5}$.

Example 1: Systems Operating Based on Re-Transmissions or Repetitions

In some of the examples of the disclosure, the system is configured to achieve a BLER target of $10^{-5}$ (e.g. to be achieved after re-transmissions, such as HARQ re-transmissions, if HARQ is used). The system can however set a different initial BLER target which is higher than that BLER target. Hence the system can aim for or achieve an initial BLER target if that initial BLER target is reasonably high (e.g. BLER=10%=$10^{-1}$) and can aim for or achieve the lower and actual BLER target following a re-transmission or after a number of transmissions. For example, if the connection is configured with a low latency parameter (e.g. a 1 ms requirement), multiple transmissions or retransmissions may be accommodated while meeting the 1 ms requirement.

In comparison to a continuous operation with a low BLER target, by operation at a higher initial BLER target, and lower BLER target at a later stage, e.g. after the re-transmission(s), can help the gNodeB (1) control system operation to achieve a BLER target operating point and/or (2) achieve the low final BLER target. By aiming for or achieving a BLER target operating point (which can be defined as the point where the BLER can be reached while reducing the number of physical bits, for example when selecting an MCS in a 5G/NR system), the system can make more optimal use of resources. For example, the system may not overly allocate physical resources in an attempt to achieve the URLLC KPI (e.g. with a strategy where fewer physical resources are later allocated once the BLER target operating point has been found), which it might for example have to do if operating in an open-loop mode.

In this example, the initial phase corresponds to the communications before and including one or a few re-transmissions (for example any number N of re-transmissions with N≤10). The system may measure how successful the transmissions are in the initial phase, for example by measuring amongst other things how many successful transmissions were sent before a transmission failed or before N transmissions failed. This may give an indication of how optimistic the first communication configuration was, for example by measuring how quickly a transmission error was found.

While the system will initially not operate at the low BLER target as expected, it will be expected to converge quicker to the target operating point for the BLER target.

Example 1-A: gNB Uses a Small Sub-Slot in the Initialisation Phase

In this example, the gNB operates the link in two different regimes:
Initial phase. Initial BLER target=10%=$10^{-1}$. The gNodeB expects there to be a significant number of re-transmissions (e.g. if initial BLER target=10%, the gNodeB expects that 10% of the initial transmissions will lead to re-transmissions). The gNodeB can quickly converge to operating with a 10% BLER target.

Stable or steady state phase. Stable BLER target=$10^{-5}$. The gNodeB attempts to achieve the high reliability or URLLC target with a single transmission (and no re-transmissions). The gNB takes a longer time to converge with operating with this lower BLER target.

In this example, the gNB configures the system to operate with a smaller sub-slot length during the initial phase. Accordingly, by operating with a smaller sub-slot length, the system can schedule a re-transmission earlier, allowing the system to operate at a higher target BLER for initial transmissions, which is expected to lead to convergence being achieved more quickly. It is also expected that in many cases, this will at the same time allow the URLLC BLER target to be reached, for example after one or more re-transmissions or repetitions.

By using smaller sub-slots sizes, there can be more transmissions per unit time and hence more ACK/NACK feedback. This can mean that the initialisation phase can be shorter as a result. More importantly, in cases where the low BLER target is associated with a low latency requirement (e.g. as in URLLC), smaller sub-slot sizes can also mean that the system can operate with a high BLER for initial transmissions and still meet the URLLC BLER target after one or more re-transmissions which are carried out within the low latency allowance.

The system can increase the sub-slot length during the steady state phase. Accordingly, by operating with a longer sub-slot length, less control signalling is required and communications are more efficient.

Additionally, the UE may not have to perform as much Physical Downlink Control Channel (PDCCH) decoding and the speed of that decoding is less critical. For example, if the UE decodes fewer PDCCH and can decode those PDCCH more slowly, UE power consumption may thereby be reduced.

In some cases, the transition from the initial or initialisation phase to the steady state phase may be triggered or effected based on an event or a condition. For example, the stable phase may start or be initiated when one or any combination of the following conditions or events occurs:
- a target error rate being achieved (e.g., using the example above, if $10^6$ transport blocks have been sent with 10 or less being unsuccessfully received or leading to a negative acknowledgement or NACK),
- once the transmission of a first transport block has been completed or likewise, once the transmission of a predetermined number transport blocks has been completed (wherein retransmissions and/or repetition may be used when transmitting the first transport block or predetermined number transport blocks)
- a threshold number of cycles being reached in a transmission configuration loop (e.g. CQI loop or otherwise),
- a number of negative acknowledgement being received, or
- a maximum and/or minimum threshold being reached for a parameter in a transmission configuration loop, where the maximum and/or minimum values may be absolute values or relative values defined in respect of another reference value (e.g. in the CQI loop example above, if the CF parameter doesn't deviate from a mean or predetermined value by more than predetermined amount).

The sub-slot length can be reduced in one of several different ways:
- Use of a higher sub-carrier spacing (SCS), for example, 30 kHz, 60 kHz or 120 kHz rather than 15 kHz that might otherwise be used. Higher SCS can have shorter OFDM symbol durations, meaning that a 14-OFDM symbol slot can be transmitted and/or scheduled in a shorter time compared to a lower SCS.
- Use of fewer OFDM symbols per sub-slot. By changing the number of OFDM symbols in a sub-slot to 2 OFDM symbols or 7 OFDM symbols, the sub-slot duration can be reduced by a factor of 7 or 2 respectively.

From one perspective, example 1-A above relies on techniques where the physical resources that will apply to the downlink (e.g. Physical Downlink Shared Channel PDSCH) will differ between an initial phase of operation and a later steady-state phase of operation.

Accordingly, convergence may be achieved more quickly and the system may have more information and control that it can use when attempting to determine which configuration to use when aiming for the low BLER target.

Example 1-B: UE Changes CQI Report Format or CQI Measurement Resource

Example 1-A relates to changing the sub-slot size (e.g. by changing the number of OFDM symbols or SCS configuration). Other changes between the initial phase and steady state phase could include changing the type of physical resource applied between the initial and steady state phases.

For example, during the initial phase, short time duration sub-slots may be used as discussed in respect of Example 1-A. With a view to providing additional physical resource in a short time duration, the gNodeB may schedule a large number of Physical Resource Blocks "PRBs" in the frequency domain. During the steady state phase, the transmissions can be made longer (e.g. when it is intended that they be received via a single transmission in 99.999% of cases, rather than via re-transmissions).

Accordingly, transmissions during the initial phase of operation may have more frequency diversity and less time diversity than transmissions during the steady state phase.

In this example, the CQI measurement resource changes between the two (or more) phases of operation. The UE can change the resources from which the CQI is measured or the CQI reference resource, where the CQI reference resource corresponds to hypothetical resources to which the CQI relates. The CQI then effectively indicates which MCS the UE would recommend if the gNB were to schedule the UE in the reference resources.

In the initial phase of operation, the CQI report may relate to a larger number of PRBs than the CQI report in the steady state phase of operation. That is to say, the "reference resource" used by the UE for the CQI estimation changes depending on the phase of operation and is increased in the initialisation phase.

Example 1-C: UE Reports A-CSI after First Transmission

Example 1 discusses an arrangement which operates in a retransmission-based mode to achieve the URLLC BLER target, whereby the initial transmission has a higher BLER target (e.g. 10%) than do the subsequent re-transmissions (e.g. $10^{-5}$).

It is also noteworthy that when the gNB needs to schedule a re-transmission, that sometimes the re-transmission effectively, for the case of a low or very low error rate target, has to be received correctly by the UE, for example in cases where there is no time for further re-transmissions within the latency budget (which is expected to be the case with many URLLC systems).

In on example, the UE can, depending on the situation or implementation:
Send an Aperiodic-Channel State Indication (A-CSI) following an initial transmission that is unsuccessfully received (e.g. that is NACKed); or
Use two types of A-CSI reports:
A first type of (e.g. "normal") A-CSI report that is used before initial transmissions or when initial transmissions are successful (e.g. when they are ACKed).
A second type (e.g. "enhanced") A-CSI report that is used when initial transmissions are unsuccessful (e.g. NACKed).

By providing more channel state information after an unsuccessful initial transmission (either by providing an A-CSI according to the first option above or by providing an enhanced A-CSI according to the second option above), the gNodeB is in a better position to make the important decision on the format to apply to the re-transmission. As mentioned above, in some cases, it can be critical for the gNB to ensure that the re-transmission is received correctly by the UE.

An example enhanced A-CSI would be one that covers a larger number of PRBs (e.g. provides CQI values for multiple subsets of PRBs). This would allow the gNodeB to make a better scheduling decision on which physical resources to use for the re-transmission. The enhanced A-CSI is likely to use more uplink resources since it contains more information and therefore is sent only when a NACK is reported. In other words, the aperiodic reporting in the initialisation phase may relate to a greater proportion of resources associated with the initial transmissions compared to the proportion of resources associated with the stable transmissions that the aperiodic reporting in the stable phase relates to.

Example 1-D: Report Indicating Recommended Number of Re-Transmissions or Repeats In this example, related to examples where the system operates in a re-transmission or repetition mode, the CQI report from the UE indicates a recommendation from the UE about the number of re-transmissions or repetitions that the UE expects would be required to achieve the low (e.g. URLLC) BLER target.

Based on the CQI report, the gNodeB can then change the sub-slot duration such that the number of re-transmissions or repetitions can performed within the latency period, for example so that they can be fitted into the URLLC latency budget. Accordingly, the low error rate can be met (or expected to be met) while other requirements can also be met (or expected to be met), such as latency requirements.

In some examples, the gNodeB can also change the number of PRBs allocated per sub-slot in order to keep the amount of physical resource per allocation constant.

The recommended number of re-transmissions or repetitions can be based on an MCS for a reference target BLER, for example, the CQI would indicate an MCS based on a target BLER of $10^{-1}$ for a single transmission and further indicate the recommended number of retransmissions or repetitions using this MCS to achieve a BLER target of $10^{-5}$. The reference target BLER can be predefined, for example according to an agreed standard or configuration, configured via RRC signalling and/or indicated in the Downlink Channel Information (e.g. DCI) scheduling an A-CSI.

In some cases, the report can be sent using RRC signalling, in contrast to current systems that rely on CQI reporting at the physical layer.

Example 1-E: Report Recommends Single Transmission or Re-Transmissions/Repeats

In this example, the UE reports to the gNodeB (e.g. via RRC signalling) whether the UE recommends trying to achieve the BLER target using a single transmission or via re-transmissions. For example, if the UE considers that the channel is static, the UE may recommend using a single transmission, whereas if the channel is time-varying the UE may recommend using a re-transmission scheme (allowing re-transmissions to be scheduled if an initial transmission is subject to a fade).

From one perspective, example 1-E corresponds to example 1-D where the number of repetition or re-transmission can be reported as 0, without any repetition or re-transmissions recommended in some cases.

Example 2: gNB Starts by Using a Shorter PUCCH Format in the Initial Phase

As in example 1 above, this illustrative example we will be based on an example initial target error rate of $10^{-1}$ and an example target error rate of $10^{-5}$.

Accordingly and as above, the gNB operates the link in two different regimes:
Initial phase. Initial BLER target=10%=$10^{-1}$. The gNodeB expects there to be a significant number of re-transmissions (e.g. if initial BLER target=10%, the gNodeB expects that 10% of the initial transmissions will lead to re-transmissions). The gNodeB can quickly converge to operating with a 10% BLER target.
Stable or steady state phase. Stable BLER target=$10^{-5}$. The gNodeB attempts to achieve the high reliability or URLLC target with a single transmission (and no re-transmissions). The gNB takes a longer time to converge when operating with this lower BLER target.

In this example, the gNB configures the system to operate with a shorter Physical Uplink Control CHannel "PUCCH" format during the initial phase and increases the length of the PUCCH format during the steady state phase.

When using a longer PUCCH format, more HARQ ACK/NACK bits can be multiplexed in the same PUCCH, thereby reducing signalling overhead while a shorter PUCCH format enables a faster ACK/NACK reporting.

Alternatively, the gNB configures the system to operate with a short PUCCH multiplexing window in the initial phase and a longer multiplexing window in the steady state phase. The PUCCH multiplexing window is the time duration in which the HARQ ACK/NACK feedbacks for the PDSCHs within this time duration are multiplexed into a single PUCCH.

When using a shorter PUCCH format (e.g. size) or shorter PUCCH multiplexing window, the time taken to send HARQ ACK/NACK feedback signalling can thereby be reduced, allowing the system to schedule a re-transmission more quickly. It can be helpful to operate with such a shorter PUCCH in an initial phase where more re-transmissions are expected.

Example 3: UE Sends More than One Acknowledgement Report Related to a Received Transport Block In this example, the UE can send more than one acknowledgement (e.g. ACK/NACK) report related to a received transport block or to a set of repetitions of a received transport block. A first acknowledgement report may relate to a higher initial BLER target and a second ACK/NACK report may relate to a lower (e.g. steady state) BLER target. By operating in this dual or more generally multiple mode in the initial phase, the gNodeB may be able to make a more informed decision on which communication parameters are expected to help meet the BLER target.

In one example, once the desired steady state URLLC BLER target is achieved (e.g. once the target error rate is reached), the UE can stop reporting multiple acknowledgement reports and can revert to transmitting fewer reports, for example a single report per received transport block.

Further sub-examples are discussed below.

Example 3-A: Repetitions

In this example, rather than using re-transmissions to try to achieve the target URLLC BLER (e.g. BLER=$10^{-5}$), the gNB uses repetitions of the transport block. The repetitions of the transport block can be scheduled by a single PDCCH (such that a single PDCCH schedules both the first repetition and the second repetition), which can be helpful to meet some latency requirements.

The UE sends acknowledgement (e.g. ACK/NACK) feedback on each of the repetitions. Hence, if a transport block is sent using two repetitions, the acknowledgement feedback will include a first acknowledgement related to the first repetition and a second acknowledgement related to the combined decoding of the first and second repetitions.

Based on the acknowledgement for the first repetition, the gNodeB can attempt to achieve a higher initial BLER target (which can be helpful for example where a controlling CQI outer loop can operate reasonably quickly, due to the gNB receiving many NACKs), while at the same time achieving the URLLC BLER target when the second repetition is received.

The gNodeB can also change the transmission parameters of the first and second repetitions in order to achieve the desired initial BLER target and the lower desired BLER target when using the second repetition.

In addition to sending acknowledgements (e.g. ACK/NACK) to individual PDSCH repetitions, the UE also sends an overall ACK/NACK, i.e. one after combining the PDSCH repetitions as per the legacy system. The UE can thus be configured to send any suitable acknowledgement based on any selection of one or more repetitions for a given transmission.

In some examples, the UE can send an acknowledgement (e.g. ACK/NACK) for each cumulative repetition. For example if three repetitions (e.g. PDSCH repetitions) are received, the UE firstly reports an ACK/NACK based on only the $1^{st}$ repetition, a second ACK/NACK based on combining the $1^{st}$ & $2^{nd}$ repetitions and a third ACK/NACK based on combining the $1^{st}$, $2^{nd}$ & $3^{rd}$ ACK/NACK.

It is noteworthy that in some examples, the coding rates of the first repetition and second repetition can be different. For example, more physical resources may be applied to the second repetition than to the first repetition. Use of the different code rates can allow the gNodeB to achieve a first BLER target for a first repetition and a second BLER target for a second repetition. The PDCCH can signal the code rate of both the first repetition and the second repetition separately.

In some examples, the code rate of the first repetition can be signalled using via a downlink control channel (e.g. PDCCH) and a scaling factor can be signalled by RRC wherein the scaling factor can be used to derive or determine the code rate of the second repetition. It is noted that the CQI outer loop for the second repetition may then operate more slowly than that of the first repetition (due to the low rate of NACK feedback), hence the scaling factor to determine the code rate of the second repetition can be updated at the slower rate that is associated with RRC signalling.

In some cases, the gNodeB can initially operate in a mode where the initial repetition is targeted at achieving a higher BLER target (e.g. BLER=10%) and the second repetition is encoded with an MCS with redundancy that is expected to be sufficient for the URLLC BLER target to be achieved (e.g. the second repetition uses the maximum amount of redundancy possible). This can help ensure that both the URLLC reliability target is met and the initial BLER can be kept under control. If the CQI outer loop receives a number of NACKs that enables it to reach the low target BLER, the gNB can transition to a steady state mode of operation where the gNodeB can choose an MCS based on a CQI outer loop-based determination of appropriate MCS.

In some examples, the gNodeB initially operates using repetitions and then switches to a mode whereby it schedules re-transmissions. Initially the gNodeB may be unsure of the BLER that will be achieved for its initial transmissions and hence automatically sends at least one repetition. Once the gNodeB gathers more information and knows the BLER that can be achieved for its initial transmissions (or that can be expected to be achieved), it can switch to a more resource-efficient mode where it operates without repetition. It can then use for example re-transmissions as provided in many mobile networks.

Example 3-B: ACK/NACK on Transport Blocks Decoded Using Partial Physical Resource(s)

In some examples, the UE transmits ACK/NACK information based on decoding transport blocks using partial amounts of the allocated physical resource.

In current mobile networks, a transport block is typically coded to provide a set of systematic bits and parity bits. These coded bits are then mapped to physical resources. In the example of a 14-OFDM symbol slot, the coded bits are mapped to 14 OFDM symbols.

The UE can then attempt to decode the transport block based on a fewer OFDM symbols than all the OFDM symbols in the slot. For example, if a slot consists of 14 OFDM symbols and the transport block is coded with a code rate of 1/3, the UE may attempt to decode the transport block using the first 7 OFDM symbols. In this case, the code rate that the UE decodes based on these 7 OFDM symbols will be 2/3.

Hence in this example, the UE can send ACK/NACK signalling indicating the ACK/NACK status related to decoding the transmission using only some of the OFDM symbols or physical bits of the original transmission. In most systems, when transport blocks are transmitted, more physical bits will be sent, made of systematic bits and parity bits. When using more parity bits, the reliability of the transmission can be increased however this is usually done at the expense of the effective throughput: for an identical data rate at the physical level, the data rate at the transport level will be reduced when more parity bits are used—or the physical data rate might have to be increased if the data rate at the transport level is to be maintained while the number of parity bits is increased. As an illustrative example, in a case where 1,000 transport bits are transmitted, 3,000 physical bits may actually be sent at the physical level. The decoding is usually expected to be carried out on all the received bits, e.g. 3,000 bits (assuming all physical bits have been received). According to an example technique of the present disclosure, the terminal may attempt to decode the transmission using less than all of the received physical bits—for example 2,000 physical bits or 1,500 physical bits in this example.

For example, the decoding of the transport block can be done for (1) the physical resources consisting of the first 7 OFDM symbols and (2) the full set of physical resources consisting of the full 14 OFDM symbols. The gNB can then use the information relating to the two decoding attempts to attempt to derive communication parameters for achieving the target BLER.

In some examples, the gNB can operate its CQI outer loop function on both pieces of ACK/NACK information: the ACK/NACKs related to the transmission decoded using partial resources can be used to provide rapid convergence of the CQI outer loop and those related to the transmission decoded using the full set of physical resources can be used to achieve the final URLLC BLER target.

While the example above discusses two decoding attempts, one partial and one full, it will be appreciated that more than two attempts can be carried out, for example two partial attempts (on two different partial sets of physical bits) and a full attempt. It is also conceivable that the decoding attempts may be based on partial decoding attempts only, without a full decoding attempt. For example, if at least one partial decoding attempt was successful, the terminal may not attempt a full decoding (it may report the full decoding as successful it is needs to report on whether it could be decoded or not).

In some cases, the gNodeB can control how the UE reports ACK/NACK status for partial transport blocks. For example, the gNodeB can signal coding rates ($CR_1$ and $CR_2$) at which the UE should report ACK/NACK. The gNodeB can for example instruct the UE that it should send an ACK/NACK status for:

Code rate 1/2 and code rate 1/3; or
Code rate 1/2 and the code rate that is actually used for the transmission itself (the native code rate); or
The native code rate, $CR_{native}$, and that native code rate scaled by a scaling factor, SF. For example, if the native code rate of the transmission were 1/3 and the scaling factor were 2, the UE would report ACK/NACK status for both a code rate of 1/3 and a code rate of 2/3 (=$SF \times CR_{native}$).

In such a case, the UE can then:
Receive over the air the full set of physical bits ($N_{phy}$ bits in total) related to a PDSCH transmission.
Receive the transport block size for the transmission, TBS, e.g. based on DCI signalling in PDCCH.
Receive (e.g. via RRC signalling) the scaling factor, SF.
Determine $CR_{native} = TBS/N_{phy}$
Determine $CR_1 = CR_{native}$ and $CR_2 = SF \times CR_{native}$
Assemble the $N_{phy}$ bits and attempt to decode the transport block (this is according to a code rate $CR_{native} = CR_1$), creating an ACK/NACK result $AN_1$.
Assemble a set of $TBS/CR_2$ bits (e.g. the first $TBS/CR_2$ physical bits that are received) and attempt to decode the transport block based on this number of physical bits. This decoding operation leads to an ACK/NACK status $AN_2$.
The UE reports (e.g. in a physical uplink control channel such as the PUCCH) both $AN_1$ and $AN_2$.
The gNodeB uses $AN_2$ to drive a fast-operating (high rate of NACKs) CQI outer loop, allowing for quick convergence) and uses $AN_1$ to drive a CQI outer loop that controls the BLER associated with the final high reliability target (e.g. URLLC target).

As will be appreciated, by having two different phases where different ACK/NACK reports are used in the initial phase, the base station can gather additional information which will assist in meeting the lower target error rate while the use of a higher error rate than the actual target will facilitate a faster convergence, in particular (but not only) in cases where a CQI outer-loop arrangement is implemented in a base station.

Example 4: New Types of Reporting to Support CQI Operation at a Low BLER Target

The following examples relate to the UE sending one or more new types of report to support CQI operation at a low BLER, which can in particular be useful for assisting a rapid convergence to the low target error rate.

For example, these reports can assist the gNodeB in achieving the URLLC BLER target KPI using single transmissions while operating a CQI outer loop that operates at a higher BLER target.

Two further sub-cases are being considered below. Namely:
example 4-A considers new types of CQI report;
example 4-B is concerned with sending information for assisting the gNodeB in interpolating MCS to apply for different BLER targets so as to identify an MCS (or other communication configuration) to apply to attempt to achieve the actual BLER target.

Example 4-A: UE Determines Preferred Code Rate Based on Receiving Transport Block at Multiple Different Code Rates In this example, the UE can decode received transport blocks at multiple different code rates in order to determine the BLER associated with these different code rates. The UE can then either:

Example 4-A-i: report the BLER at the different code rates. The code rates that the UE should report can be signalled by the gNodeB to the UE (for example via RRC signalling). In this case the UE will expect the gNB to do the estimation or interpolation.
Example 4-A-ii: send a report to the gNodeB indicating the code rate required to achieve the URLLC BLER target (e.g. $10^{-5}$). In this case the UE will do the estimation or interpolation and report to the gNB.

The UE can decode the transport block at different code rates by puncturing (that is, ignoring during the decoding process) different numbers of received physical bits. The puncturing or selecting some but not all of the physical bits received enables the UE to simulate decoding at different coding rates.

For example, if the UE is scheduled with a transport block containing 1,000 transport bits and receives 3,000 physical bits, an example way that the UE can decode with different code rates is described in Table 1.

TABLE 1

| Code rate | TBS | $N_{phy}$ | Method |
|---|---|---|---|
| 1/3 | 1000 | 3000 | All received physical bits are used in the decoding process |
| 1/2 | 1000 | 2000 | First 2000 received physical bits are used in the decoding process |
| 2/3 | 1000 | 1500 | First 1500 received physical bits are used in the decoding process |

Figure 9:
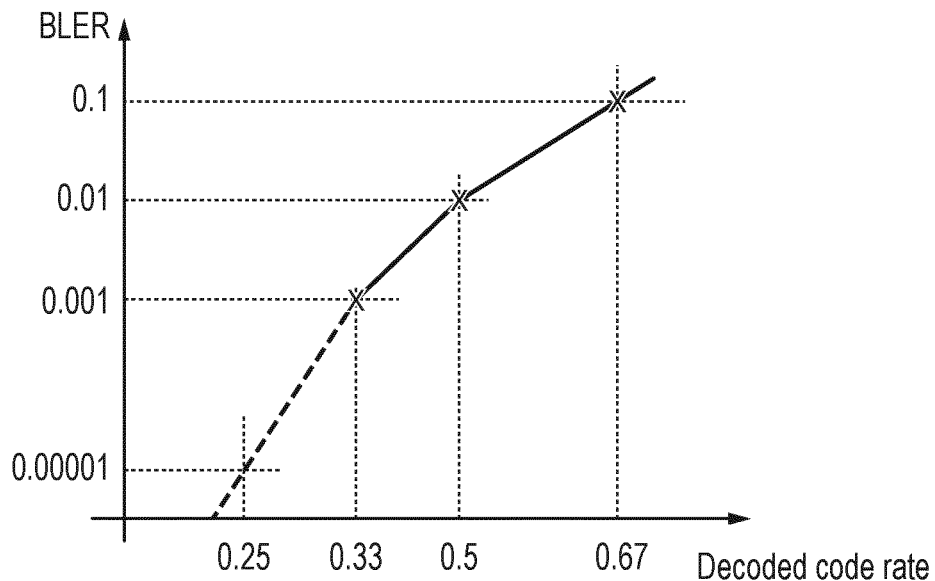
FIG. 9 illustrates an example estimation of a modulation and coding scheme for a target error rate.

The UE can then analyse the number of NACKs for each decoded code rate, from which BLERs at each of the decoded code rates can be derived. FIG. 9 illustrates an example estimation of a modulation and coding scheme for a target error rate. Based on error rates for difference transmission configurations, the UE (or gNB in another example) can derive an expected transmission configuration when trying to achieve the target error rate.

FIG. 9 shows three measured BLERs (crosses) at the decoded code rates of 0.33, 0.5 and 0.67. The UE (or eNB depending on the example) can then extrapolate the BLER in view of the code rate curve, as illustrated with the dashed line in FIG. 9. In this example, it can for example estimate that a code rate of 0.25 is likely to achieve a BLER of 0.00001 ($10^{-5}$). It is noteworthy that the extrapolation does not have to be a linear extrapolation.

It is noteworthy that in some cases, rather than defining a set of code rates at which the UE should decode the transport block, the gNodeB could define a number of OFDM symbols at which the UE should decode the transport block (e.g. according to example 3-B, the UE could be signalled to indicate the BLER when decoding transport blocks using 8, 10, 12 and 14 OFDM symbols respectively).

In Example 4-A-ii, the UE can then report (e.g. via PUCCH) that a code rate of 0.25 is required to achieve the URLLC reliability target of BLER=$10^{-5}$. The report can take the form of a quantised number (as per legacy CSI reporting). A PUCCH message may be used by the UE to report the BLERs for each of the code rates to the gNodeB.

As mentioned above, in Example 4-A-ii, the UE can interpolate/extrapolate from the BLERs at the decoded code rates in order to determine a code rate (and hence MCS) that would be appropriate to meet the URLLC reliability requirement.

Example 4-A-iii: gNodeB Sends Multiple Transport Blocks/Code Blocks Using Different MCS In this example the gNodeB transmits multiple transport blocks/code blocks using different MCS (or more generally different transmission configurations). This can be done with a view to assisting the UE in determining the BLER that would be achieved at different MCS or in providing more accurate reporting information.

The UE can then either report the BLERs for the different MCSs (as per example 4-A-i) or form an interpolation curve (as per example 4-A-ii). The gNodeB can transmit multiple transport blocks/code blocks at different MCS using one of the following methods:

- An allocation for a UE includes a transport block containing higher layer data at a first MCS (e.g. appropriate for the initial higher BLER target) and dummy transport blocks containing dummy data at a different MCS. The dummy transport blocks are used solely to allow the UE to determine the BLER when a different MCS is applied (e.g. via the interpolation methods discussed above).

- An allocation for a UE includes a transport block containing higher layer data at a first MCS (e.g. appropriate for the URLLC BLER target) and additionally the same transport block coded at a different MCS. The additional transport blocks can be used to allow the UE to determine the BLER when a different MCS is applied (e.g. via the interpolation methods discussed above). The additional transport blocks can also be soft-combined, as repetitions using a different redundancy version, with the transport block encoded at the first MCS. For example, if a transport block is transmitted using two different modulation and coding schemes MCS1 and MCS2, the terminal can decode using the physical bits sent for the MCS1 configuration, decode using the physical bits sent for the MCS2 configuration and may also decode using the combined physical bits received for MCS1 and MCS2. This can for example be used to confirm that the transport block was decoded correctly or to obtain additional information on which modulation and coding schemes to use (in some cases, it may be that the decoding using each of MCS1 and MCS2 was unsuccessful but the decoding using the physical bits received for both MCS1 and MCS2 was successful).

- An allocation for a UE includes a transport block comprising multiple code blocks, whereby the different code blocks are encoded using different MCS. For example, some code blocks can be used to carry eMBB traffic (with a BLER target of 10%) and other code blocks can be used to carry URLLC traffic (with a BLER target of $10^{-5}$). Again, the differently encoded code blocks can be used to allow the UE to determine the BLER when a different MCS is applied (e.g. via the interpolation methods discussed above).

It is noteworthy that a transport block may consist of multiple code blocks. Each code block can be channel-coded separately and can have a CRC attached to it. For example, if a 10,000 bit transport block is encoded as two 5,000 bit code blocks, a CRC is attached to the first set of 5,000 bits and these are LDPC (Low Density Parity Check) encoded as a first code block and a different CRC is attached to the second set of 5,000 bits and these are LDPC encoded as a second code block. The physical bits from the two code blocks are concatenated (and potentially interleaved) to produce the set of physical bits for the transport block.

Example 4-B: Interpolation Parameters

In some cases, the UE (or gNB) can determine interpolation parameters to allow for interpolation between an MCS required to achieve a first higher BLER target (e.g. BLER target=10%) and an MCS required to achieve a second BLER lower target (e.g. BLER target=$10^{-5}$). The interpolation parameters can for example include:

- A slope of a BLER vs MCS curve (which is for example illustrated in FIG. 9, since the MCS is almost proportional to code rate for a fixed modulation level).
- Parameters for a higher order interpolation between BLER and MCS (e.g. the interpolation parameters could define the shape of a spline curve).
- Parameters for a piecewise linear relationship between BLER and MCS.

Since the interpolation parameters are not expected to change quickly, these interpolation parameters could be signalled by the UE to the gNodeB using RRC signalling, rather than CQI signalling (taking into account that RRC signalling is generally slower than RRC signalling).

The teachings can apply equally if the gNodeB is carrying out the interpolation for a UE (or for two or more UEs).

Example 4-B-i: gNodeB Pools Interpolation Parameters from Multiple UEs

In this example, the gNodeB receives interpolation parameters from multiple UEs and can average those interpolation parameters.

The gNodeB can for example:
- Use the average interpolation parameters for all UEs in the cell; and/or
- Use the average interpolation parameters for UEs that newly attach to the cell and UE-specific interpolation parameters otherwise It should be pointed out that the average interpolation parameters can be applied to a UE, the whole cell or to a geographic region of the cell. In some cases, UE location might have to be signalled in order to facilitate implementation, for example by signalling location co-ordinates (e.g. GPS) along with the interpolation parameters.

Using a set of average interpolation parameters may be appropriate when the long term relationship between BLER and MCS depends on the channel characteristics of the cell. For example, a first set of interpolation parameters could be appropriate for a cell deployed in an urban scenario whereas a second set of interpolation parameters could be appropriate for a cell deployed in a rural scenario.

Example 4-B-ii: UE Signals Previous Interpolation Parameters when it Connects to a Cell In this example, a UE can store interpolation parameters (see discussions above) for one, some of or each cell that it has attached to. When the UE attaches to a cell, it includes those interpolation parameters in connection establishment signalling. The interpolation parameters can be updated with time as the UE stays connected to the cell, but these stored (historic) interpolation parameters may provide a relatively reliable first estimate of the currently appropriate interpolation parameters in the absence of any additional information.

Example 5: Changing A-CSI Reports Based on a Timer

In some examples, methods can be used which change the CQI table that is used in the A-CSI report.

In legacy or current systems, there are three different CQI tables where each table contains a different range of MCSs. The CQI provides an estimation of the MCS required for a reference PDSCH to achieve a specific BLER target. Two of these tables target a BLER of $10^{-1}$ and one of them targets a BLER of $10^{-5}$.

As mentioned above, with a view to having the CQI outer loop functionality converging more rapidly, it can be desirable for the CQI outer loop functionality to switch between operating at a first higher target BLER and a second lower target BLER:

In an example, the UE sends an A-CSI where the CQI is based on a lower BLER target if it has sent a CQI report in the past $T_{BLER}$ ms. The gNodeB would then base its CQI outer loop on the higher BLER target (to rapidly adapt to potentially new channel conditions) if it hasn't received a CQI report for a time greater than $T_{BLER}$, otherwise it would base its CQI outer loop functionality around the lower BLER target.

Basing a CQI on a certain BLER target can be effected by using a CQI table that is appropriate for that BLER target (as discussed above).

Note that in some more particular examples, a hysteresis parameter can be applied to switching between operating with the different BLER targets (e.g. if the UE is triggered to start operating with the higher BLER target, it would continue to report using the higher BLER target for a period $T_{BLER\_hysteresis}$.

This ensures that the gNodeB would receive enough CQI reports and ACK/NACKs in order to rapidly converge its MCS selection functionality).

Example 6: Use of a Different CSI Granularity for A-CSI Reports Based on GC-DCI In yet another example, a Group Common Downlink Channel Information "GC-DCI" indicates which CQI tables the UE should base its A-CSI report on. In an implementation, only two CQI tables can be indicated, for example, one based on a BLER target of $10^{-1}$ and another based on a BLER target of $10^{-5}$.

In another example, CQI tables with finer MCS granularity are introduced and the GC-DCI indicates to the UE that such a table is to be used. The CQI is an index to a specific MCS based on a reference Physical Downlink Shared CHannel "PDSCH" with a target of a specific BLER. For example, Table 2 below is a CQI table where each CQI index represents a specific Modulation and Code Rate giving an efficiency. In this example, the GC-DCI can indicate to the UE to report CQI based on finer MCS granularity or efficiency granularity, thereby focusing on a specific range of MCS.

For example, if the UE's CQI=8 based on Table 2 the network can ask the UE to "expand" on this range, for example using a CQI based on Table 3 that focuses more around the range of 16QAM with Code Rate of 490/1024 (new finer granularity entries are highlighted grey in Table 3 below).

The following are aspects of this example, extracted from the above paragraph:
- The gNodeB operates using a first CQI table and based on a CQI report from that table instructs the UE to use a second CQI table (where there can be a choice from multiple CQI tables).
- Two possible options can be:
  - Each of the multiple CQI tables has finer granularity of MCS for some range of the CQI table. The "finer granularity sections" of the different CQI tables are different: e.g. one table has finer granularity centred around 16QAM with Code Rate of 490/1024 (e.g. Table 3), whereas another CQI table has finer granularity centred around QPSK with code rate 308/1024); or
  - The maximum and/or minimum values of the MCS in the different CQI tables can be different (e.g. whereas Table 2, spans an MCS range of QPSK rate 78/1024 to 64QAM rate 948/1024, a different table could span a range of QPSK rate 78/1024 to 16QAM rate 490/1024 with finer granularity steps between the MCS); or
  - The different tables have a structure with a combination of the above options (e.g. Table 3)

TABLE 2

CQI table from Table 5.2.2.1-2 of TS38.214 [6]

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 3

CQI table with finer granularity around 16 QAM

| CQI index | modulation | code rate × 1024 | efficiency |
|---|---|---|---|
| 0 | | out of range | |
| 1 | QPSK | 449 | 0.8770 |
| 2 | QPSK | 602 | 1.1758 |
| 3 | 16QAM | 378 | 1.4766 |
| 4 | 16QAM | 400 | 1.5625 |
| 5 | 16QAM | 420 | 1.6406 |
| 6 | 16QAM | 450 | 1.7578 |
| 7 | 16QAM | 470 | 1.8360 |
| 8 | 16QAM | 490 | 1.9141 |
| 9 | 16QAM | 520 | 2.0313 |
| 10 | 16QAM | 560 | 2.7305 |
| 11 | 16QAM | 596 | 2.1875 |
| 12 | 16QAM | 616 | 2.4063 |
| 13 | 64QAM | 466 | 2.7305 |
| 14 | 64QAM | 567 | 3.3223 |
| 15 | 64QAM | 666 | 3.9023 |

In another example, the UE can send an A-CSI where the CQI is based on a finer MCS granularity if it has sent a CQI report in the past $T_{MCS}$ using a coarser MCS granularity.

Accordingly, with teachings and techniques provided herein, communications can be configured to operate initially at a higher error rate than desired, to obtain measurements during the initial phase (giving for example an indication of performance) and to configure the communications to operate at a lower error rate wherein the configuration is based on the measurements made during the initial phase.

It will be appreciated that while the present disclosure has in some respects focused on implementations in a 5G or NR network as such a network is expected to provide the primary use case at present, the same teachings and principles can also be applied to other wireless telecommunications systems. Thus, even though the terminology used herein is generally the same or similar to that of the 5G (or LTE) standards, the teachings are not limited to the present versions 5G (or LTE) and could apply equally to any appropriate arrangement not based on 5G/LTE, for example any arrangement possibly compliant with any future version of an LTE, 5G or other standards—defined by the 3GPP standardisation groups or by other groups.

It will be appreciated that the principles described herein are not applicable only to certain types of communications device, but can be applied more generally in respect of any types of communications device, for example while the techniques are expected to be particularly useful for URLLC and/or IoT devices or other low latency communications devices, the skilled person will appreciate that they can also be applied more generally, for example in respect of any type of communications device operating with a wireless link to the communication network, or for peer-to-peer transmissions (either transmissions ending at another node of the radio access network, e.g. a communication device or any other type of node in the network, or transmissions to or from the main or core network and going through a mesh network in the radio access network).

It will further be appreciated that the principles described herein are applicable not only to 5G/NR-based wireless telecommunications systems (although they are particularly relevant to them), but are applicable for any type of wireless telecommunications system.

It is also noteworthy that the teaching provided herein using 3GPP, LTE and/or 5G/NR terminology can be equally applied to other systems. For example, references to ACK/NACK, CQI/CSI or BLER can be more generally understood as references to positive/negative acknowledgements, indicators relating to channel or link quality or error rates.

Further particular and preferred aspects of the present invention are set out in the accompanying independent and dependent claims. It will be appreciated that features of the dependent claims may be combined with features of the independent claims in combinations other than those explicitly set out in the claims, so long as they are technically plausible and feasible.

Thus, the foregoing discussion discloses and describes merely illustrative examples of the present disclosure and this disclosure is intended to be illustrative, but not limiting of the scope of the invention. The disclosure, including any readily discernible variants or equivalents of the teachings herein, define, in part, the scope of the foregoing claim terminology such that no inventive subject matter is dedicated to the public.

Also, while the examples above have been described using the example of communications between a terminal and a base station, the skilled person will appreciate that the communications may be between a terminal and one or more of: a base station, a TRP, a RRH (Remote Radio Head), a mobile terminal (e.g. connected through a side-link or PC5 interface), a relay, any radio access network node or more generally any other mobile node.

It is noteworthy that where a "predetermined" element is mentioned, it will be appreciated that this can include for example a configurable element, wherein the configuration can be done by any combination of a manual configuration by a user or administrator or a transmitted communication, for example from the network or from a service provider (e.g. a device manufacturer, an OS provider, etc.).

Also even in cases where the communications can be viewed from the perspective of being between a terminal and a base station or mobile node, in some cases the communications may be sent through another network node, for example a relay or a next hop toward the (destination) network node.

Respective features of the present disclosure are defined by the following numbered clauses:

Clause 1. A method of configuring transmissions in a mobile telecommunications network based on a target error rate for the transmissions, the transmissions being between a first mobile node of the mobile telecommunications network and a second mobile node of the mobile telecommunications network, the method comprising:

in an initialisation phase, the first and second mobile nodes communicating in accordance with a first error rate and a first communication configuration, wherein the first error rate is greater than the target error rate;

measuring an initial transmission quality associated with transmissions in the initialisation phase;

based on the initial transmission quality associated with the first communication configuration, determining a second communication configuration corresponding to the target error rate; and in a stable phase, the first and second mobile nodes communicating in accordance with the target error rate and the second communication configuration.

Clause 2. The method of Clause 1 wherein the initialisation phase terminates once N unsuccessful transmissions have been detected in the communications between the first and second mobile nodes, with N equal to or greater than one.

Clause 3. The method of Clause 2 wherein the number N of unsuccessful transmissions is set based on either the first error rate or the target error rate.

Clause 4. The method of any preceding Clause further comprising, in the initialisation phase, the first and second mobile nodes communicating in accordance with an intermediate communication configuration which is associated with an intermediate error rate lower than the first error rate.

Clause 5. The method of any preceding Clause wherein downlink transmission sub-slots in the first communication configuration are shorter than downlink transmission sub-slots in the second communication configuration.

Clause 6. The method of any preceding Clause comprising measuring a further transmission quality associated with transmissions in the stable phase, wherein the initial transmission quality is associated with measurements for a first set of resource units the further transmission quality is associated with measurements for a second set of resource units, a first ratio of the number of resource units in the first set relative to the number of resource units in the transmissions in the initialisation phase is greater than a second ratio of the number of resource units in the second set relative to the number of resource units in the transmissions in the stable phase.

Clause 7. The method of any preceding Clause comprising identifying a transmission from the second mobile node to the first mobile node which is unsuccessful and identifying whether the identified transmission was during the initialisation phase and, if the identified transmission was during the initialisation phase, the first mobile node transmitting an aperiodic quality indication to the second mobile node.

Clause 8. The method of any preceding Clause comprising identifying a transmission from the second mobile node to the first mobile node which is unsuccessful;

if the identified transmission was during the initialisation phase, the first mobile node transmitting an aperiodic quality indicator of a first type to the second mobile node.

if the identified transmission was during the stable phase, the first mobile node transmitting an aperiodic quality indicator of a second type to the second mobile node, the second type of aperiodic quality indicator being different from the first type of aperiodic quality indicator.

Clause 9. The method of any preceding Clause further comprising, the first mobile node estimating, based on the measured initial transmission quality, a number of re-transmissions or repetitions for reaching the target error rate;

the first mobile node reporting to the second mobile node the estimated number of re-transmissions or repetitions; and the second mobile node determining a second communication configuration based on the reported estimated number of re-transmissions or repetitions.

Clause 10. The method of any preceding Clause wherein an allocated format or window of an uplink control channel for reporting whether downlink transmissions have been successful is smaller in the first communication configuration compared to the allocated format or window, respectively, in the second communication configuration.

Clause 11. The method of any preceding Clause wherein, in the initialisation phase, the first mobile node uses a first number of acknowledgement messages to acknowledge each transmission from the second mobile node and, in the stable phase, the first mobile node uses a second number of acknowledgement messages to acknowledge each transmission from the second mobile node, the second number of acknowledgement messages being different from and less than the first number of acknowledgement messages.

Clause 12. The method of Clause 11 wherein, in the initialisation phase, the number of acknowledgement messages to acknowledge a given transmission from the second mobile node comprises an acknowledgement message corresponding to a first repetition of the given transmission and a second acknowledgement message corresponding to a combination of a first repetition of the given transmission and a second repetition of the given transmission.

Clause 13. The method of Clause 11 or 12 wherein, in the initialisation phase, the number of acknowledgement messages to acknowledge a given transmission from the second mobile node comprises an acknowledgement message corresponding to a decoding attempt using a first coding rate and a further acknowledgement message corresponding to a further decoding attempt using a further coding rate, the further coding rate being different from the first coding rate.

Clause 14. The method of Clause 11, 12 or 13 wherein, in the initialisation phase, the first mobile node is configured to measure an initial transmission quality associated with transmissions in the initialisation phase using a full decoding attempt for decoding a first transmission received from the second mobile node in the initialisation phase using all symbols or physical bits for the first transmission; and a partial decoding attempt for decoding the first transmission using some but not all symbols or physical bits, respectively, for the first transmission;

wherein the method further comprises transmitting a first acknowledgement message relating to the full decoding attempt and a second acknowledgement message relating to the partial decoding attempt.

Clause 15. The method of any preceding Clause wherein the first communication configuration is associated with a repetition of two or more for at least some of the transmissions and wherein the second communication configuration is associated with a deactivation of the repetition of the transmissions.

Clause 16. The method of any preceding Clause wherein measuring an initial transmission quality comprises the first mobile node measuring for at least a transmission, a detected error rate for each of a plurality of coding rates.

Clause 17. The method of Clause 16 wherein measuring for the at least a transmission, a detected error rate for each of a plurality of coding rates comprises the first mobile node puncturing the at least a transmission to simulate receiving the at least a transmission at different coding rates.

Clause 18. The method of Clause 16 or 17 wherein the at least a transmission comprises two or more portions, a first portion of the two or more portions being encoded using a first coding rate and a further portion of the two or more portions being encoded using a further coding rate different from the first coding rate, and
    wherein the first mobile node determines an error rate associated with the first portion and a second error rate associated with a second portion.

Clause 19. The method of any one of Clauses 16 to 18 further comprising the first mobile node:
    transmitting an error rate report indicating the detected error rate for each of a plurality of coding rates; and/or
    deriving, based on the target error rate and on the detected error rate for each of a plurality of coding rates, a recommended coding rate for achieving the target error rate and transmitting a recommendation report indicating the recommended coding rate.

Clause 20. The method of any one of Clauses 16 to 19 further comprising the first or second mobile node determining one or more interpolation parameters based on transmission quality information from at least mobile node, wherein the interpolation parameters are for determining a configuration for a transmission parameter based on a desired error rate and based on known error rates for other configurations of the transmission parameter.

Clause 21. The method of Clause 20 comprising:
    at least one of the first and second mobile nodes storing the determined one or more interpolation parameters; and
    upon detection of a reconnection event between the first mobile node and the second mobile node, using the stored interpolation parameters to determine a configuration for a transmission parameter based on a desired error rate for communications between the first mobile node and the functional node.

Clause 22. The method of Clause 20 or 21 further comprising the first or second mobile node, respectively, transmitting the one or more interpolation parameters.

Clause 23. The method of any preceding Clause further comprising:
    reporting the measured transmission quality associated with the first communication configuration;
    measuring a further transmission quality associated with transmissions in the stable phase
    wherein the first communication configuration is associated with a first timing configuration for reporting the measured transmission quality and the second communication configuration is associated with a second timing configuration for reporting the measured further transmission quality; and
    wherein the first timing configuration indicates more frequent reporting opportunities than the reporting opportunities indicated in the second timing configuration.

Clause 24. The method of Clause 23 wherein
    the reporting of the measured transmission quality is based on a transmission quality relative to the first error rate and
    wherein the reporting of the measured further transmission quality is based on a transmission quality relative to the target error rate.

Clause 25. The method of Clause 23 or 24 wherein
    the reporting of the measured transmission quality is based on a transmission quality relative to the first error rate and a transmission quality relative to the second error rate different from the first error rate; and
    wherein the reporting of the measured further transmission quality is based on a transmission quality relative to the target error rate.

Clause 26. The method of any preceding Clause further comprising:
    reporting the measured transmission quality associated with the first communication configuration;
    wherein reporting the measured transmission quality comprises:
        transmitting a first transmission quality report based on the measured transmission quality;
        determining if a predetermined timer has expired since the previous transmission quality report was transmitted; and
    transmitting a further transmission quality report based on the measured transmission quality, wherein
    if the predetermined timer has expired since the previous transmission quality report was transmitted, the further transmission quality report is based on the first error rate
    if the predetermined timer has not expired since the previous transmission quality report was transmitted, the further transmission quality report is based on the target error rate.

Clause 27. The method of any preceding Clause further comprising the first mobile node reporting the measured transmission quality associated with the first communication configuration by
    first reporting the measured transmission quality associated with the first communication configuration based on a first correspondence table, wherein the first correspondence table associates transmission quality measurements with one or more reporting values;
    based on the measured transmission quality, later reporting the measured transmission quality based on a second correspondence table associating transmission quality measurements with one or more reporting values, the second correspondence table being different from the first correspondence table.

28. The method of Clause 27, comprising the second mobile node, based on the first reported measured transmission quality, instructing the first mobile node to report the measured transmission quality based on the second correspondence table.

Clause 29. The method of Clause 27 or 28 wherein
    each of the first and second correspondence tables associates modulation and coding schemes with corresponding reporting values;
    the first mobile node reporting the measured transmission quality comprises the first mobile node selecting a modulation and coding scheme based on a desired error rate and reporting a value corresponding to the selected modulation scheme; and
    the first and second correspondence tables are associated with the same desired error rate and the second correspondence table provides a finer granularity of modulation and coding schemes around the modulation and coding scheme first reported using the first table.

Clause 30. The method of any preceding Clause wherein the first communication configuration comprises one or more of: a sub-slot size; a number of symbols per sub-slot, a number of resource blocks in a sub-slot, a modulation and coding scheme and an allocated size of an uplink control channel for reporting whether downlink transmissions have been successful.

Clause 31. The method of any preceding Clause wherein the second communication configuration comprises one or more of: a sub-slot size; a number of symbols per sub-slot, a number of resource blocks in a sub-slot, a modulation and coding scheme and an allocated size of an uplink control channel for reporting whether downlink transmissions have been successful.

Clause 32. The method of any preceding Clause wherein the first mobile node is one or more of: a mobile terminal, a UE, a mobile station and a relay.

Clause 33. The method of any preceding Clause wherein the second mobile node is one or more of a base station, a relay, a remote radio head, a mobile station and a transmission/reception point.

Clause 34. The method of any preceding Clause wherein the target error rate is one or more of: less than or equal to 10-2; less than or equal to 10-3; less than or equal to 10-4; less than or equal to 10-5; less than or equal to 10-6.

Clause 35. A method of operating a first mobile node in a mobile telecommunications network and for configuring transmissions based on a target error rate for the transmissions, the transmissions being between the first mobile node and a second mobile node of the mobile telecommunications network, the method comprising the first mobile node:
  in an initialisation phase, communicating with the second mobile node in accordance with a first error rate and a first communication configuration, wherein the first error rate is greater than the target error rate;
  measuring an initial transmission quality associated with transmissions in the initialisation phase;
  determining, based on the initial transmission quality associated with the first communication configuration, a second communication configuration corresponding to the target error rate; and
  in a stable phase, communicating with the second mobile node in accordance with the target error rate and the second communication configuration.

Clause 36. The method of Clause 35 further comprising, in the initialisation phase, the first mobile node communicating with the second mobile node in accordance with an intermediate communication configuration which is associated with an intermediate error rate lower than the first error rate.

Clause 37. The method of Clauses 35 or 36 comprising the first mobile node measuring a further transmission quality associated with transmissions in the stable phase, wherein
  the initial transmission quality is associated with measurements for a first set of resource units
  the further transmission quality is associated with measurements for a second set of resource units,
  a first ratio of the number of resource units in the first set relative to the number of resource units in the transmissions in the initialisation phase is greater than a second ratio of the number of resource units in the second set relative to the number of resource units in the transmissions in the stable phase.

Clause 38. The method of any one of Clauses 35 to 37 further comprising the first mobile node identifying a transmission from the second mobile node which was unsuccessful and the first mobile node identifying whether the identified transmission was during the initialisation phase and, if the identified transmission was during the initialisation phase, the first mobile node transmitting an aperiodic quality indication to the second mobile node.

Clause 39. The method of any one of Clauses 35 to 38 comprising
  the first mobile node identifying a transmission from the second mobile node to the first mobile node which was unsuccessful;
  if the identified transmission was during the initialisation phase, the first mobile node transmitting an aperiodic quality indicator of a first type to the second mobile node; and
  if the identified transmission was during the stable phase, the first mobile node transmitting an aperiodic quality indicator of a second type to the second mobile node, the second type of aperiodic quality indicator being different from the first type of aperiodic quality indicator.

Clause 40. The method of any one of Clauses 35 to 39 further comprising,
  the first mobile node estimating, based on the measured initial transmission quality, a number of re-transmissions or repetitions for reaching the target error rate; and
  the first mobile node reporting to the second mobile node the estimated number of re-transmissions or repetitions.

Clause 41. The method of any one of Clauses 35 to 40 wherein, in the initialisation phase, the first mobile node uses a first number of acknowledgement messages to acknowledge each transmission from the second mobile node and, in the stable phase, the first mobile node uses a second number of acknowledgement messages to acknowledge each transmission from the second mobile node, the second number of acknowledgement messages being different from and less than the first number of acknowledgement messages.

Clause 42. The method of any one of Clauses 35 to 41 wherein the first mobile node measuring an initial transmission quality comprises the first mobile node measuring for at least a transmission, a detected error rate for each of a plurality of coding rates.

Clause 43. The method of Clause 42 further comprising the first mobile node determining one or more interpolation parameters based on transmission quality information from a plurality of mobile nodes, wherein the interpolation parameters are for determining a configuration for a transmission parameter based on a desired error rate from known error rates for other configurations of the transmission parameter.

Clause 44. The method of Clause 42 or 43 further comprising the first mobile node:
  storing the determined one or more interpolation parameters; and
  upon detection of a reconnection event between the mobile node and the second mobile node, using the stored interpolation parameters to determine a configuration for a transmission parameter based on a desired error rate for communications between the first mobile node and the functional node.

Clause 45. The method of any one of Clauses 35 to 44 further comprising the first mobile node:
  reporting the measured transmission quality associated with the first communication configuration;
  measuring a further transmission quality associated with transmissions in the stable phase
  wherein the first communication configuration is associated with a first timing configuration for reporting the measured transmission quality and the second communication configuration is associated with a second timing configuration for reporting the measured further transmission quality; and wherein the first timing configuration indicates more frequent reporting opportunities than the reporting opportunities indicated in the second timing configuration.

Clause 46. The method of any one of Clauses 35 to 45 further comprising:

reporting the measured transmission quality associated with the first communication configuration;

wherein reporting the measured transmission quality comprises:

transmitting a first transmission quality report based on the measured transmission quality;

determining if a predetermined timer has expired since the previous transmission quality report was transmitted transmitting a further transmission quality report based on the measured transmission quality, wherein if the predetermined timer has expired since the previous transmission quality report was transmitted, the further transmission quality report is based on the first error rate if the predetermined timer has not expired since the previous transmission quality report was transmitted, the further transmission quality report is based on the target error rate.

Clause 47. The method of any one of Clauses 35 to 46 further comprising the first mobile node reporting the measured transmission quality associated with the first communication configuration by first reporting the measured transmission quality associated with the first communication configuration based on a first correspondence table, wherein the first correspondence table associates a transmission quality measurement with one or more reporting values;

based on the measured transmission quality, later reporting the measured transmission quality based on a second correspondence table associating transmission quality measurements with one or more reporting values, the second correspondence table being different from the first correspondence table.

Clause 48. A mobile node for use in a mobile telecommunications network and for configuring transmissions based on a target error rate for the transmissions, the transmissions being between the mobile node and a second mobile node of the mobile telecommunications network, the mobile node being configured to:

in an initialisation phase, communicate with the second mobile node in accordance with a first error rate and a first communication configuration, wherein the first error rate is greater than the target error rate;

measure an initial transmission quality associated with transmissions in the initialisation phase;

determine a second communication configuration corresponding to the target error rate, wherein the second communication configuration is based on the initial transmission quality associated with the first communication configuration; and in a stable phase, communicate with the second mobile node in accordance with the target error rate and the second communication configuration.

Clause 49. A mobile node for use in a mobile telecommunications network and for configuring transmissions based on a target error rate for the transmissions, the transmissions being between the mobile node and a second mobile node of the mobile telecommunications network, the mobile node being configured to implement the method of any of Clauses 35 to 47.

Clause 50. Circuitry for a mobile node for use in a mobile telecommunications network and for configuring transmissions based on a target error rate for the transmissions, the transmissions being between the mobile node and a second mobile node of the mobile telecommunications network via a wireless access interface of the mobile telecommunications network, the circuitry comprising:

transmitter circuitry configured to transmit signals via the wireless access interface, receiver circuitry configured to receive signals via the wireless access interface, and controller circuitry configured to control the transmitter and the receiver to:

communicate, in an initialisation phase, with the second mobile node in accordance with a first error rate and a first communication configuration, wherein the first error rate is greater than the target error rate;

measure an initial transmission quality associated with transmissions in the initialisation phase;

determine, based on the initial transmission quality associated with the first communication configuration, a second communication configuration corresponding to the target error rate; and communicate, in a stable phase, with the second mobile node in accordance with the target error rate and the second communication configuration.

51. A method of operating a functional node in a mobile telecommunications network and for configuring transmissions based on a target error rate for the transmissions, and the transmissions being between a first mobile node of the mobile telecommunications network and the functional node, the method comprising the functional node:

communicating, in an initialisation phase, with the first mobile node in accordance with a first error rate and a first communication configuration, wherein the first error rate is greater than the target error rate;

based on an initial transmission quality associated with the first communication configuration, determining a second communication configuration corresponding to the target error rate; and communicating, in a stable phase, with the first mobile node in accordance with the target error rate and the second communication configuration.

Clause 52. The method of Clause 51 comprising receiving from the first mobile node a report indicating a measured initial transmission quality associated with transmissions in the initialisation phase.

Clause 53. The method of Clause 51 or 52 further comprising:

receiving from the first mobile node a report indicating an estimated number of re-transmissions or repetitions for reaching the target error rate; and determining the second communication configuration based on the reported estimated number of re-transmissions or repetitions.

Clause 54. The method of any one of Clauses 51 to 53 comprising receiving from the first mobile node a detected error rate for each of a plurality of coding rates.

Clause 55. The method of Clause 54 further comprising the functional node determining one or more interpolation parameters for determining a configuration for a transmission parameter based on a desired error rate and based on known error rates for other configurations of the transmission parameter.

Clause 56. The method of Clause 55 comprising the functional node:
deriving, based on the one or more interpolation parameters, on the target error rate and on the detected error rate for each of a plurality of coding rates, a recommended coding rate for achieving the target error rate; and
determining the second configuration based on the recommended coding rate.

Clause 57. The method of any one of Clauses 51 to 56 further comprising the functional node
receiving, from the first mobile node, one or more interpolation parameters for determining a configuration for a transmission parameter based on a desired error rate and based on known error rates for other configurations of the transmission parameter;
receiving, from at least a further mobile node of the mobile telecommunications network, one or more further interpolation parameters for determining a configuration for a transmission parameter based on a desired error rate and based on known error rates for other configurations of the transmission parameter;
averaging the received one or more interpolation parameters and the received one or more further interpolation parameters to determine one or more average interpolation parameters; and
determining a configuration for a transmission parameter based on the one or more average interpolation parameters.

Clause 58. The method of any one of Clauses 55 to 57 further comprising,
storing the one or more interpolation parameters; and
upon detection of a reconnection event between the first mobile node and the functional node, using the stored interpolation parameters to determine a configuration for a transmission parameter based on a desired error rate for communications between the first mobile node and the functional node.

Clause 59. The method of any one of Clauses 51 to 58 comprising the functional node
receiving from the first mobile node a recommended coding rate for achieving the target error rate; and
determining the second configuration based on the recommended coding rate.

Clause 60. The method of any one of Clauses 51 to 59 further comprising the functional node:
receiving from the first mobile node a report of measured transmission quality associated with the first communication configuration, the report using a first correspondence table, wherein the first correspondence table associates a transmission quality measurement with one or more reporting values;
based on the report of measured transmission quality, instructing the first mobile node to report the measured transmission quality based on a second correspondence table, the second correspondence table associating transmission quality measurements with one or more reporting values, wherein the second correspondence table is different from the first correspondence table.

Clause 61. A functional node for use in a mobile telecommunications network and for configuring transmissions based on a target error rate for the transmissions, the transmissions being between a first mobile node of the mobile telecommunications network and the functional node, the functional node being configured to:
communicate, in an initialisation phase, with the first mobile node in accordance with a first error rate and a first communication configuration, wherein the first error rate is greater than the target error rate;
determine a second communication configuration corresponding to the target error rate wherein the second communication configuration is based on an initial transmission quality associated with the first communication configuration; and
communicate, in a stable phase, with the first mobile node in accordance with the target error rate and the second communication configuration.

Clause 62. A functional node for use in a mobile telecommunications network and for configuring transmissions based on a target error rate for the transmissions, the transmissions being between a first mobile node of the mobile telecommunications network and the functional node, the functional node being configured to implement the method of any of Clauses 51 to 60.

Clause 63. Circuitry for a functional node for use in a mobile telecommunications network and for configuring transmissions based on a target error rate for the transmissions, the transmissions being between a first mobile node of the mobile telecommunications network and the functional node via a wireless access interface of the mobile telecommunications network, the circuitry comprising:
transmitter circuitry configured to transmit signals via the wireless access interface,
receiver circuitry configured to receive signals via the wireless access interface, and
controller circuitry configured to control the transmitter and the receiver to:
communicate, in an initialisation phase, with the first mobile node in accordance with a first error rate and a first communication configuration, wherein the first error rate is greater than the target error rate;
determine a second communication configuration corresponding to the target error rate wherein the second communication configuration is based on an initial transmission quality associated with the first communication configuration; and
communicate, in a stable phase, with the first mobile node in accordance with the target error rate and the second communication configuration.

Clause 64. A system for use in a mobile telecommunications network, the system comprising a first mobile node of the mobile telecommunications network and a second mobile node of the mobile telecommunications network and the system being for configuring transmissions based on a target error rate for transmissions between the first mobile node and the second mobile node,
wherein the first mobile node and second mobile node are configured to
communicate, in an initialisation phase, in accordance with a first error rate and a first communication configuration, wherein the first error rate is greater than the target error rate; and
communicate, in a stable phase, in accordance with the target error rate and a second communication configuration.
wherein
at least one of the first mobile node and second mobile node is configured to measure an initial transmission quality associated with transmissions in the initialisation phase; and at least one of the first mobile node and second mobile node is configured to determine, based on the initial transmission quality associated with the first communication configuration, the second communication configuration corresponding to the target error rate.

Clause 65. A system for use in a mobile telecommunications network, the system comprising a first mobile node of the mobile telecommunications network and a second mobile node of the mobile telecommunications network and the system being for configuring transmissions based on a target error rate for transmissions between the first mobile node and the second mobile node, wherein the system is configured to implement the method of any of Clauses 1 to 34.

The invention claimed is:

1. A method of configuring transmissions in a mobile telecommunications network based on a target error rate for the transmissions, the transmissions being between a first mobile node of the mobile telecommunications network and a second mobile node of the mobile telecommunications network, the method comprising:
    in an initialisation phase, the first and second mobile nodes communicating in accordance with a first error rate and a first communication configuration, wherein the first error rate is greater than the target error rate and the initialisation phase is at least one transport block long;
    measuring an initial transmission quality associated with transmissions in the initialisation phase;
    based on the initial transmission quality associated with the first communication configuration, determining a second communication configuration corresponding to the target error rate; and
    in a stable phase, the first and second mobile nodes communicating in accordance with the target error rate and the second communication configuration,
    wherein downlink transmission sub-slots in the initialisation phase are shorter than downlink transmission sub-slots in the stable phase.

2. The method of claim 1 wherein the initialisation phase terminates once N unsuccessful transmissions have been detected in the communications between the first and second mobile nodes, with N equal to or greater than one.

3. The method of claim 2 wherein the number N of unsuccessful transmissions is set based on either the first error rate or the target error rate.

4. The method of claim 1 further comprising, in the initialisation phase, the first and second mobile nodes communicating in accordance with an intermediate communication configuration which is associated with an intermediate error rate lower than the first error rate.

5. The method of claim 1 comprising measuring a further transmission quality associated with transmissions in the stable phase, wherein
    the initial transmission quality is associated with measurements for a first set of resource units
    the further transmission quality is associated with measurements for a second set of resource units,
    a first ratio of the number of resource units in the first set relative to the number of resource units in the transmissions in the initialisation phase is greater than a second ratio of the number of resource units in the second set relative to the number of resource units in the transmissions in the stable phase.

6. The method of claim 1 comprising identifying a transmission from the second mobile node to the first mobile node which is unsuccessful and identifying whether the identified transmission was during the initialisation phase and, if the identified transmission was during the initialisation phase, the first mobile node transmitting an aperiodic quality indication to the second mobile node.

7. The method of claim 1 comprising
    identifying a transmission from the second mobile node to the first mobile node which is unsuccessful;
    if the identified transmission was during the initialisation phase, the first mobile node transmitting an aperiodic quality indicator of a first type to the second mobile node,
    if the identified transmission was during the stable phase, the first mobile node transmitting an aperiodic quality indicator of a second type to the second mobile node, the second type of aperiodic quality indicator being different from the first type of aperiodic quality indicator.

8. The method of claim 1 further comprising,
    the first mobile node estimating, based on the measured initial transmission quality, a number of re-transmissions or repetitions for reaching the target error rate;
    the first mobile node reporting to the second mobile node the estimated number of re-transmissions or repetitions; and
    the second mobile node determining a second communication configuration based on the reported estimated number of re-transmissions or repetitions.

9. The method of claim 1 wherein an allocated format or window of an uplink control channel for reporting whether downlink transmissions have been successful is smaller in the first communication configuration compared to the allocated format or window, respectively, in the second communication configuration.

10. The method of claim 1 wherein, in the initialisation phase, the first mobile node uses a first number of acknowledgement messages to acknowledge each transmission from the second mobile node and, in the stable phase, the first mobile node uses a second number of acknowledgement messages to acknowledge each transmission from the second mobile node, the second number of acknowledgement messages being different from and less than the first number of acknowledgement messages.

11. The method of claim 10 wherein, in the initialisation phase, the number of acknowledgement messages to acknowledge a given transmission from the second mobile node comprises an acknowledgement message corresponding to a first repetition of the given transmission and a second acknowledgement message corresponding to a combination of a first repetition of the given transmission and a second repetition of the given transmission.

12. The method of claim 10 wherein, in the initialisation phase, the number of acknowledgement messages to acknowledge a given transmission from the second mobile node comprises an acknowledgement message corresponding to a decoding attempt using a first coding rate and a further acknowledgement message corresponding to a further decoding attempt using a further coding rate, the further coding rate being different from the first coding rate.

13. The method of claim 10 wherein, in the initialisation phase, the first mobile node is configured to measure an initial transmission quality associated with transmissions in the initialisation phase using
    a full decoding attempt for decoding a first transmission received from the second mobile node in the initialisation phase using all symbols or physical bits for the first transmission; and a partial decoding attempt for decoding the first transmission using some but not all symbols or physical bits, respectively, for the first transmission;
wherein the method further comprises transmitting a first acknowledgement message relating to the full decoding attempt and a second acknowledgement message relating to the partial decoding attempt.

14. The method of claim 1 wherein the first communication configuration is associated with a repetition of two or more for at least some of the transmissions and wherein the second communication configuration is associated with a deactivation of the repetition of the transmissions.

15. The method of claim 1 wherein measuring an initial transmission quality comprises the first mobile node measuring for at least a transmission, a detected error rate for each of a plurality of coding rates.

16. The method of claim 15 wherein measuring for the at least a transmission, a detected error rate for each of a plurality of coding rates comprises the first mobile node puncturing the at least a transmission to simulate receiving the at least a transmission at different coding rates.

17. The method of claim 1 further comprising:
reporting the measured transmission quality associated with the first communication configuration;
measuring a further transmission quality associated with transmissions in the stable phase
wherein the first communication configuration is associated with a first timing configuration for reporting the measured transmission quality and the second communication configuration is associated with a second timing configuration for reporting the measured further transmission quality; and
wherein the first timing configuration indicates more frequent reporting opportunities than the reporting opportunities indicated in the second timing configuration.

18. A mobile node for use in a mobile telecommunications network and for configuring transmissions based on a target error rate for the transmissions, the transmissions being between the mobile node and a second mobile node of the mobile telecommunications network, the mobile node being configured to:
in an initialisation phase, communicate with the second mobile node in accordance with a first error rate and a first communication configuration, wherein the first error rate is greater than the target error rate and the initialisation phase is at least one transport block long;
measure an initial transmission quality associated with transmissions in the initialisation phase;
determine a second communication configuration corresponding to the target error rate, wherein the second communication configuration is based on the initial transmission quality associated with the first communication configuration; and
in a stable phase, communicate with the second mobile node in accordance with the target error rate and the second communication configuration,
wherein downlink transmission sub-slots in the initialisation phase are shorter than downlink transmission sub-slots in the stable phase.

19. A functional node for use in a mobile telecommunications network and for configuring transmissions based on a target error rate for the transmissions, the transmissions being between a first mobile node of the mobile telecommunications network and the functional node, the functional node being configured to:
communicate, in an initialisation phase, with the first mobile node in accordance with a first error rate and a first communication configuration, wherein the first error rate is greater than the target error rate and the initialisation phase is at least one transport block long;
determine a second communication configuration corresponding to the target error rate wherein the second communication configuration is based on an initial transmission quality associated with the first communication configuration; and
communicate, in a stable phase, with the first mobile node in accordance with the target error rate and the second communication configuration,
wherein downlink transmission sub-slots in the initialisation phase are shorter than downlink transmission sub-slots in the stable phase.

* * * * *